(12) United States Patent
Karube et al.

(10) Patent No.: US 11,063,684 B2
(45) Date of Patent: Jul. 13, 2021

(54) OPTICAL TRANSMISSION SYSTEM, OPTICAL TRANSMISSION APPARATUS AND TRANSMISSION METHOD

(71) Applicant: FUJITSU LIMITED, Kawasaki (JP)

(72) Inventors: Ryo Karube, Kawasaki (JP); Tomoaki Takeyama, Yokohama (JP); Shinichirou Muro, Mishima (JP); Yoshio Shimano, Zushi (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/249,307

(22) Filed: Jan. 16, 2019

(65) Prior Publication Data

US 2019/0222345 A1    Jul. 18, 2019

(30) Foreign Application Priority Data

Jan. 18, 2018    (JP) .............................. JP2018-006476

(51) Int. Cl.
*H04J 14/02*    (2006.01)
*H04B 10/032*    (2013.01)

(52) U.S. Cl.
CPC ...... *H04J 14/0271* (2013.01); *H04J 14/0209* (2013.01); *H04J 14/0212* (2013.01); *H04J 14/0221* (2013.01); *H04J 14/0291* (2013.01); *H04B 10/032* (2013.01); *H04J 14/0287* (2013.01)

(58) Field of Classification Search
CPC ........................... H04B 10/038; H04J 14/0287
USPC ........................................................... 398/5
See application file for complete search history.

(56) References Cited

U.S. PATENT DOCUMENTS

| 5,777,761 | A  | * | 7/1998  | Fee .................... | H04J 14/0291 370/225 |
| 6,075,629 | A  | * | 6/2000  | Al-Salameh ......... | H04B 10/032 398/1 |
| 6,509,987 | B1 | * | 1/2003  | Hunziker ............ | H04B 10/291 398/157 |
| 6,665,113 | B2 | * | 12/2003 | Aso ........................ | G02F 2/004 359/326 |
| 6,915,075 | B1 | * | 7/2005  | Oberg ................. | H04J 14/0279 398/45 |

(Continued)

FOREIGN PATENT DOCUMENTS

JP    11-68656    3/1999
JP    11-298928    10/1999

*Primary Examiner* — Jai M Lee
(74) *Attorney, Agent, or Firm* — Fujitsu Patent Center

(57) ABSTRACT

An optical transmission apparatus includes a first transmitter configured to output an optical signal having a wavelength belonging to a first wavelength band, a switch configured to output the optical signal outputted to the first transmitter toward a first transmission line or a second transmission line, a wavelength converter configured to convert the optical signal outputted from the switch toward the first transmission line into an optical signal having a wavelength belonging to a second wavelength band other than the first wavelength band, a second transmitter configured to output an optical signal having a wavelength belonging to the first wavelength band, and a first multiplexer configured to multiplex the optical signal outputted from the first wavelength converter and the optical signal outputted from the second transmitter, and output a multiplexed optical signal to the first transmission line.

8 Claims, 13 Drawing Sheets

(56) References Cited

U.S. PATENT DOCUMENTS

| | | | |
|---|---|---|---|
| 7,099,578 B1* | 8/2006 | Gerstel | H04J 14/0295 370/216 |
| 7,532,817 B1* | 5/2009 | Ko | H04B 10/032 398/20 |
| 7,546,034 B2* | 6/2009 | Mueller | H04B 10/032 398/5 |
| 10,541,774 B1* | 1/2020 | Dai | H04B 10/272 |
| 2001/0021045 A1* | 9/2001 | Tervonen | H04B 10/07955 398/5 |
| 2001/0026384 A1* | 10/2001 | Sakano | H04J 14/0297 398/79 |
| 2002/0141008 A1* | 10/2002 | Chbat | H04B 10/2941 398/26 |
| 2003/0077030 A1* | 4/2003 | Oberg | H04B 10/032 385/24 |
| 2003/0156840 A1* | 8/2003 | Uchikata | H04J 14/0212 398/7 |
| 2003/0161629 A1* | 8/2003 | Frascolla | H04Q 11/0062 398/5 |
| 2004/0001715 A1* | 1/2004 | Katagiri | H04B 10/2916 398/81 |
| 2004/0114627 A1* | 6/2004 | Han | H04J 14/0227 370/468 |
| 2004/0141229 A1* | 7/2004 | Kakui | H01S 3/06716 359/342 |
| 2004/0161232 A1* | 8/2004 | Kerfoot, III | H04J 14/0295 398/5 |
| 2005/0123296 A1* | 6/2005 | Touma | H04J 14/02 398/45 |
| 2006/0177219 A1* | 8/2006 | Tsuritani | H04J 14/0246 398/5 |
| 2009/0297152 A1* | 12/2009 | Bainbridge | H04Q 11/0067 398/79 |
| 2013/0039643 A1* | 2/2013 | Tokura | H04B 10/032 398/7 |
| 2014/0023371 A1* | 1/2014 | Nanjo | H04J 14/0295 398/79 |
| 2019/0109666 A1* | 4/2019 | Kato | H04J 14/0256 |
| 2019/0305852 A1* | 10/2019 | Kato | H04B 10/614 |

* cited by examiner

OPTICAL TRANSMISSION SYSTEM, OPTICAL TRANSMISSION APPARATUS AND TRANSMISSION METHOD

CROSS-REFERENCE TO RELATED APPLICATION

This application is based upon and claims the benefit of priority of the prior Japanese Patent Application No. 2018-6476, filed on Jan. 18, 2018, the entire contents of which are incorporated herein by reference.

FIELD

The embodiments discussed herein are related to a transmission system and a transmission method.

BACKGROUND

With an increase in demand for communication, an increase in transmission capacity of the wavelength multiplexed optical transmission (WDM: Wavelength Division Multiplexing) has been demanded (refer to, for example, Japanese Laid-open Patent Publication Nos. 11-68656 and 11-298928). For example, when transmission is performed using only the wavelength multiplexed optical signal in the C (Conventional) band, the wavelength band is limited to 1530 to 1565 (nm).

For this reason, it has been considered to increase the WDM transmission capacity by extending the wavelength band to the L (Long) band of 1565 to 1625 (nm) and the S (Short) band of 1460 to 1530 (nm). For example, Japanese Laid-open Patent Publication No. 11-68656 and Japanese Laid-open Patent Publication No. 11-298928 are disclosed as related arts.

For example, in a transmission system in which the wavelength multiplexed optical signals in the C band, the L band, and the S band are multiplexed and transmitted, many optical components including an optical coupler, an optical amplifier, and a wavelength converter are used. In consideration of this situation, in the case where the transmission system has a redundant configuration, since the wavelength multiplexed optical signal in each of the wavelength band is made redundant and transmitted from a transmitter to a receiver, the double number of optical components are required.

For example, as described in Japanese Laid-open Patent Publication No. 11-68656, since all optical signals are made redundant, when an optical switch for selecting a transmission line is provided between each transmitter and a coupler, and between each receiver and a demultiplexer, the same number of optical switches as the number of wavelengths used in all wavelength bands (that is, the number of optical signals) is required. Since multiplexed light of wavelength multiplexed optical signals in each wavelength band is generated by multiplexing the optical signals in stages, the optical coupler has a multi-staged configuration. Thus, an optical amplifier for compensating a decrease in the OSNR (Optical Signal-to-Noise Ratio) due to power loss is requested.

Therefore, the transmission system using the C band, the L band, and the S band is larger than the transmission system using a single wavelength band in size of the redundant configuration, causing a cost problem, for example.

In consideration of the above-described situation, it is desirable to provide a transmission system and a transmission method that may reduce the size of the redundant configuration.

SUMMARY

According to an aspect of the embodiments, an optical transmission apparatus includes a first transmitter configured to output an optical signal having a wavelength belonging to a first wavelength band, a switch configured to output the optical signal outputted to the first transmitter toward a first transmission line or a second transmission line, a wavelength converter configured to convert the optical signal outputted from the switch toward the first transmission line into an optical signal having a wavelength belonging to a second wavelength band other than the first wavelength band, a second transmitter configured to output an optical signal having a wavelength belonging to the first wavelength band, and a first multiplexer configured to multiplex the optical signal outputted from the first wavelength converter and the optical signal outputted from the second transmitter, and output a multiplexed optical signal to the first transmission line.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

First Comparative Example

Figure 1:
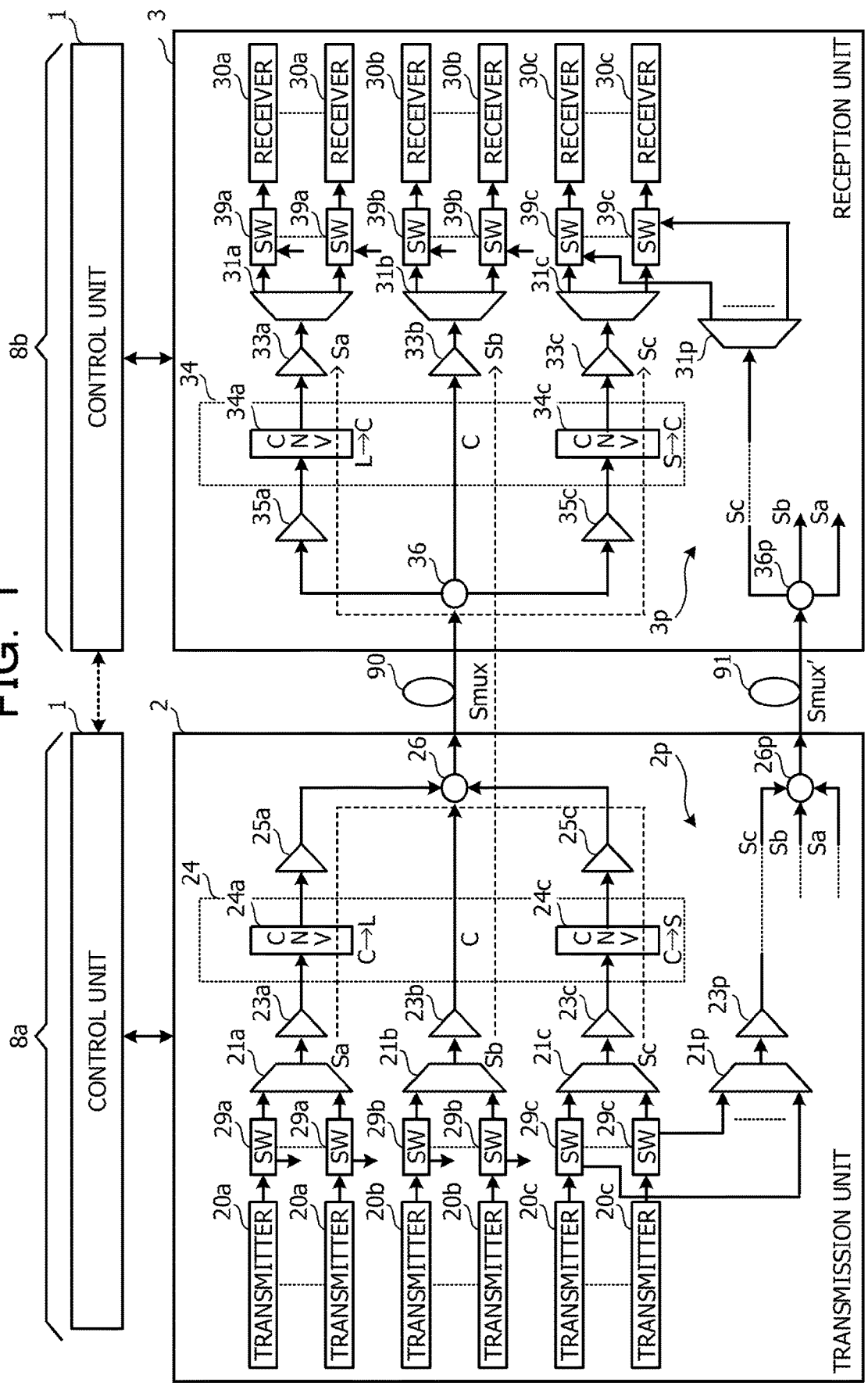
FIG. 1 is a configuration view illustrating a transmission system in First comparative example.

FIG. 1 is a configuration view illustrating a transmission system in First comparative example. As an example, the transmission system has a pair of transmission apparatuses 8a, 8b interconnected via an active transmission line 90 and a preliminary transmission line 91, which each are configured of an optical fiber or the like.

Only the wavelength multiplexed optical signals Sa to Sc having no fault on the path are transmitted to the active transmission line 90, and only one wavelength multiplexed optical signal having a fault on the path among the wavelength multiplexed optical signals Sa to Sc is transmitted to the preliminary transmission line 91. The transmission system described in this specification is also used as a DCI (Data Center Interconnect) system.

The transmission apparatus 8a has a control unit 1 and a transmission unit 2, and the transmission apparatus 8b has a control unit 1 and a reception unit 3. As represented by dotted lines, the transmission unit 2 multiplexes the wavelength multiplexed optical signals Sa to Sc in the C band, the L band, and the S band to generate multiplexed light Smux, and transmits the multiplexed light Smux to the reception unit 3 through the active transmission line 90. Since the multiplexed light is also transmitted from the transmission apparatus 8b to the transmission apparatus 8a in the opposite direction, the transmission apparatus 8a has its own reception unit 3 and the transmission apparatus 8b has its own transmission unit 2. However, the reception unit 3 and the transmission unit 2 are not illustrated.

The control unit 1, the transmission unit 2, and the reception unit 3 each are configured of a circuit board on which a plurality of electronic components and optical components are mounted, and are implemented in a slot of each of the transmission apparatuses 8a, 8b. The control unit 1, the transmission unit 2, and the reception unit 3 each are connected to a corresponding wiring board in each of the transmission apparatuses 8a, 8b via an electrical connector, and exchange data via the wiring board.

The transmission unit 2 has a plurality of transmitters 20a to 20c, a plurality of optical switches (SW) 29a to 29c, a plurality of multiplexers 21a to 21c, 26, a plurality of optical amplifiers 23a to 23c, 25a, 25c, and a wavelength conversion section 24. The wavelength conversion section 24 has a wavelength converter (CNV) 24a for converting the C band into the L band, and a wavelength converter 24c for converting the C band into the S band.

The transmission unit 2 further has a preliminary transmission processing section 2p. The preliminary transmission processing section 2p processes the wavelength multiplexed optical signal outputted to the preliminary transmission line 91. The preliminary transmission processing section 2p includes the same configuration as the above-described multiplexers 21a to 21c, 26, optical amplifiers 23a to 23c, 25a, 25c, and wavelength conversion section 24. However, FIG. 1 only illustrates a multiplexer 21p corresponding to the multiplexer 21c, an optical amplifier 23p corresponding to the optical amplifier 23c, and a multiplexer 26p corresponding to the multiplexer 26. The preliminary transmission processing section 2p may be provided in a unit separated from the transmission unit 2.

The transmitters 20a, the optical switches 29a, the multiplexer 21a, the optical amplifiers 23a, 25a, and the wavelength converter 24a are provided on a path for the wavelength multiplexed optical signal Sa. Each of the transmitters 20a generates an optical signal having a wavelength in the C band, and outputs the optical signal to the optical switch 29a. The transmitters 20a to 20c are connected to LAN (Local Area Network) or the like on the client side. For example, an optical signal is generated from an Ethernet (registered trademark, the same applies hereinafter) signal.

The optical switch 29a selects a destination of the optical signal from the active transmission line 90 and the preliminary transmission line 91. When selecting the active transmission line 90 as the destination, the optical switch 29a outputs the optical signal to the multiplexer 21a. The multiplexer 21a is, for example, an optical coupler, multiplexes the optical signals inputted from the optical switches 29a to generate the wavelength multiplexed optical signal Sa in the C band, and outputs the wavelength multiplexed optical signal Sa to the optical amplifier 23a.

The optical amplifier 23a is, for example, an EDFA (Erbium Doped optical Fiber Amplifier), amplifies the wavelength multiplexed optical signal Sa, and outputs the amplified optical signal to the wavelength converter 24a. Thereby, the optical amplifier 25a compensates power loss of the wavelength multiplexed optical signal Sa generated by the multiplexer 21a.

The wavelength converter 24a converts the wavelength band of the wavelength multiplexed optical signal Sa from the C band into the L band, and outputs the wavelength-converted signal to the optical amplifier 25a. The wavelength converters 24a, 24c are wavelength converters as described in Japanese Laid-open Publication No. 2000-75330.

The optical amplifier 25a is, for example, an EDFA, and amplifies the wavelength multiplexed optical signal Sa in the wavelength band converted into the L band. Thereby, the optical amplifier 25a compensates power loss of the wavelength multiplexed optical signal Sa due to wavelength conversion.

The transmitters 20b, the optical switches 29b, the multiplexer 21b, and the optical amplifier 23b are provided on a path for the wavelength multiplexed optical signal Sb. Each of the transmitters 20b generates an optical signal having a wavelength in the C band, and outputs the optical signal to the optical switch 29b.

The optical switch 29b selects a destination of the optical signal from the active transmission line 90 and the preliminary transmission line 91. When selecting the active transmission line 90 as the destination, the optical switch 29b outputs the optical signal to the multiplexer 21b. The multiplexer 21b is, for example, an optical coupler, multiplexes the optical signals inputted from the optical switches 29b to generate the wavelength multiplexed optical signal Sb in the C band, and outputs the wavelength multiplexed optical signal Sb to the optical amplifier 23b.

The optical amplifier 23b is, for example, an EDFA, amplifies the wavelength multiplexed optical signal Sb, and outputs the amplified optical signal to the multiplexer 26. Thereby, the optical amplifier 23b compensates power loss of the wavelength multiplexed optical signal Sb generated by the multiplexer 21b.

The transmitters 20c, the optical switches 29c, the multiplexer 21c, the optical amplifiers 23c, 25c, and the wavelength converter 24c are provided on a path for the wavelength multiplexed optical signal Sc. Each of the transmitters 20c generates an optical signal having a wavelength in the C band, and outputs the optical signal to the optical switch 29c.

The optical switch 29c selects a destination of the optical signal from the active transmission line 90 and the preliminary transmission line 91. When selecting the active transmission line 90 as the destination, the optical switch 29c outputs the optical signal to the multiplexer 21c. The multiplexer 21c is, for example, an optical coupler, multiplexes the optical signals inputted from the optical switches 29c to generate the wavelength multiplexed optical signal Sc in the C band, and outputs the wavelength multiplexed optical signal Sc to the optical amplifier 23c.

The optical amplifier 23c is, for example, an EDFA, amplifies the wavelength multiplexed optical signal Sc, and outputs the amplified optical signal to the wavelength converter 24c. Thereby, the optical amplifier 23c compensates power loss of the wavelength multiplexed optical signal Sc generated by the multiplexer 21c.

The wavelength converter 24c converts the wavelength band of the wavelength multiplexed optical signal Sc from the C band into the S band, and outputs the wavelength-converted signal to the optical amplifier 25c. The optical amplifier 25c is, for example, an EDFA, and amplifies the wavelength multiplexed optical signal Sc in the wavelength band converted into the S band. Thereby, the optical amplifier 25c compensates power loss of the wavelength multiplexed optical signal Sc due to wavelength conversion.

The multiplexer 26 receives an input of the wavelength multiplexed optical signal Sa in the L band from the optical amplifier 25a, an input of the wavelength multiplexed optical signal Sb in the C band from the optical amplifier 23b, and an input of the wavelength multiplexed optical signal Sc in the S band from the optical amplifier 25c. The multiplexer 26 multiplexes the wavelength multiplexed optical signals Sa to Sc to generate the multiplexed light Smux, and outputs the multiplexed light Smux to the active transmission line 90. That is, the multiplexer 26 wavelength-multiplexes the wavelength multiplexed optical signals Sa to Sc in the respective bands.

When selecting the preliminary transmission line 91 as the destination, the optical switch 29c output the optical signal to the multiplexer 21p of the preliminary transmission processing section 2p. When selecting the preliminary transmission line 91 as the destination, the other optical switches 29a, 29b output the optical signals to the multiplexer 21p of the preliminary transmission processing section 2p. Hereinafter, each multiplexer of the preliminary transmission processing section 2p is defined as the multiplexer 21p, and each optical amplifier in a later stage of the multiplexer of the preliminary transmission processing section 2p is defined as the optical amplifier 23p.

The multiplexer 21p of the preliminary transmission processing section 2p multiplexes the optical signals to be outputted to the preliminary transmission line 91, to generate the wavelength multiplexed optical signals Sa to Sc, and outputs the wavelength multiplexed optical signals Sa to Sc to the optical amplifier 23p. The optical amplifier 23p amplifies the wavelength multiplexed optical signals Sa to Sc outputted from the multiplexer 21p, and outputs the amplified wavelength multiplexed optical signals Sa to Sc to the wavelength converter (corresponding to wavelength conversion section 24) of the preliminary transmission processing section 2p. Thereby, the optical amplifier 23p compensate of power loss of the wavelength multiplexed optical signals Sa to Sc generated by the multiplexer 21p.

The wavelength bands of wavelength multiplexed optical signals Sa to Sc amplified by the optical amplifier 23p are converted into the C band, the L band, and the S band by the wavelength converter. Further, the wavelength multiplexed optical signals Sa, Sc, the wavelength bands of which are converted into the L band and the S band, respectively, are amplified by the optical amplifier (corresponding to optical amplifiers 25a, 25c) of the preliminary transmission processing section 2p, and inputted to the multiplexer 26p. The wavelength multiplexed optical signal Sb in the C band is also inputted to the multiplexer 26p. The multiplexer 26p multiplexes the wavelength multiplexed optical signals Sa to Sc in the respective wavelength bands to generate multiplexed light Smux', and outputs the multiplexed light Smux' to the preliminary transmission line 91.

As described above, in the transmission unit 2, optical switches 29a to 29c are provided between the transmitters 20a to 20c and the multiplexers 21a to 21c, and the preliminary transmission processing section 2p has the same configuration as the configuration including multiplexers 21a to 21c, 26, the optical amplifiers 23a to 23c, 25a, 25c, and the wavelength conversion section 24.

The control unit 1 of the transmission apparatus 8a is configured of, for example, a CPU (Central Processing Unit) circuit, and controls the transmission unit 2. The control unit 1 detects a fault about each of the wavelength multiplexed optical signals Sa to Sc, and switches the optical switches 29a to 29c according to the fault.

For example, when detecting failure of the optical amplifier 23a for the wavelength multiplexed optical signal Sa, the control unit 1 controls each of the optical switches 29a such that the destination of the wavelength multiplexed optical signal Sa is switched from the active transmission line 90 to the preliminary transmission line 91. When detecting failure of the wavelength converter 24c for the wavelength multiplexed optical signal Sc, the control unit 1 controls each of the optical switches 29c such that the destination of the wavelength multiplexed optical signal Sc is switched from the active transmission line 90 to the preliminary transmission line 91.

The reception unit 3 has a plurality of receivers 30a to 30c, a plurality of optical switches 39a to 39c, a plurality of demultiplexers 31a to 31c, 36, optical amplifiers 33a to 33c, 35a, 35c, and a wavelength conversion section 34. The wavelength conversion section 34 has a wavelength converter (CNV) 34a for converting the L band into the C band, and a wavelength converter 34c for converting the S band into the C band.

The reception unit 3 further includes a preliminary reception processing section 3p. The preliminary reception processing section 3p processes multiplexed light Smux' inputted from the preliminary transmission line 91. The reception unit 3 includes the same configuration as the configuration including the demultiplexers 31a to 31c, 36, the optical amplifiers 33a to 33c, 35a, 35c, and the wavelength conversion section 34. However, FIG. 1 only illustrates a demultiplexer 36p corresponding to the demultiplexer 36, and a demultiplexer 31p corresponding to the demultiplexer 31c. The preliminary reception processing section 3p may be provided in a unit separated from the reception unit 3.

The demultiplexer 36 receives multiplexed light Smux from the active transmission line 90. The demultiplexer 36 is, for example, an optical splitter, and demultiplexes the multiplexed light Smux by wavelength band to split the multiplexed light Smux into the wavelength multiplexed optical signals Sa to Sc outputted to the active transmission line 90. The demultiplexer 36 outputs the wavelength multiplexed optical signal Sa in the L band to the optical amplifier 35a, outputs the wavelength multiplexed optical signal Sb in the C band to the optical amplifier 33b, outputs the wavelength multiplexed optical signal Sc in the S band to the optical amplifier 35c.

The optical amplifiers 35a, 35c, 33b are, for example, EDFAs, and amplify the wavelength multiplexed optical signals Sa to Sc, respectively. Thereby, the optical amplifiers 35a, 35c, 33b compensate power loss of wavelength multiplexed optical signals Sa to Sc due to demultiplexing.

The optical amplifier 35a outputs the wavelength multiplexed optical signal Sa to the wavelength converter 34a. The wavelength converter 34a converts the wavelength band of the wavelength multiplexed optical signal Sa from the L band into the C band, and outputs the wavelength multiplexed optical signal Sa to the optical amplifier 33a. The wavelength converters 34a, 34c are wavelength converters as described in Japanese Laid-open Publication No. 2000-75330.

The optical amplifier 33a is, for example, an EDFA, and amplifies the wavelength multiplexed optical signal Sa. Thereby, the optical amplifier 33a compensates power loss of the wavelength multiplexed optical signal Sa due to wavelength conversion. The optical amplifier 33a outputs the wavelength multiplexed optical signal Sa to the demultiplexers 31a.

The demultiplexer 31a is, for example, an optical splitter, and demultiplexes the wavelength multiplexed optical signal Sa by wavelength to split the wavelength multiplexed optical signal Sa into a plurality of optical signals. The demultiplexer 31a outputs each optical signal to the optical switch 39a.

The optical switch 39a selects a source of an optical signal for the receiver 30a from the active transmission line 90 and the preliminary transmission line 91. When selecting the active transmission line 90 as the source of the optical signal, the optical switch 39a outputs the optical signal inputted from the demultiplexer 31a to the receiver 30a.

The receiver 30a receives the optical signal inputted from the optical switch 39a. For example, the receivers 30a to 30c each are connected to a LAN on the client side, generate an Ethernet signal, and the Ethernet signal to the LAN.

The optical amplifier 33b outputs the wavelength multiplexed optical signal Sb to the demultiplexer 31b.

The demultiplexer 31b is, for example, an optical splitter, and demultiplexes the wavelength multiplexed optical signal Sb by wavelength to split the wavelength multiplexed optical signal Sb into a plurality of optical signals. The demultiplexer 31b outputs the optical signals to the respective optical switches 39b.

The optical switch 39b selects a source of an optical signal for a receiver 30b from the active transmission line 90 and the preliminary transmission line 91. When selecting the active transmission line 90 as the source of the optical signal, the optical switches 39b outputs the optical signal inputted from the demultiplexer 31b to the receiver 30b.

The receiver 30b receives the optical signal inputted from the optical switch 39b.

The optical amplifier 35c outputs the wavelength multiplexed optical signal Sc to the wavelength converter 34c. The wavelength converter 34c converts the wavelength band of the wavelength multiplexed optical signal Sc from the S band into the C band, and outputs the wavelength multiplexed optical signal Sc to the optical amplifier 33c.

The optical amplifier 33c is, for example, an EDFA, and amplifies the wavelength multiplexed optical signal Sc. Thereby, the optical amplifier 33c compensates power loss of the wavelength multiplexed optical signal Sc due to wavelength conversion. The optical amplifier 33c outputs the wavelength multiplexed optical signal Sc to the demultiplexer 31c.

The demultiplexer 31c is, for example, an optical splitter, and demultiplexes the wavelength multiplexed optical signal Sc by wavelength to split the wavelength multiplexed optical signal Sc into a plurality of optical signals. The demultiplexer 31c outputs each optical signal to the optical switch 39c.

The optical switch 39c selects a source of an optical signal for a receiver 30c from the active transmission line 90 and the preliminary transmission line 91. When selecting the active transmission line 90 as the source of the optical signal, the optical switches 39c outputs the optical signal inputted from the demultiplexer 31c to the receiver 30c.

The receiver 30c receives the optical signal inputted from the optical switch 39c.

The demultiplexer 36p of the preliminary reception processing section 3p receives multiplexed light Smux' from the preliminary transmission line 91. The demultiplexer 36p demultiplexes the multiplexed light Smux' by wavelength band to split the multiplexed light Smux into the wavelength multiplexed optical signals Sa to Sc outputted to the preliminary transmission line 91. The demultiplexer 36p outputs the split wavelength multiplexed optical signals Sa, Sc to the optical amplifier (corresponding to optical amplifiers 35a, 35c) of the preliminary reception processing section 3p.

Further, the wavelength bands of the wavelength multiplexed optical signals Sa to Sc are converted into the C band by a wavelength conversion section (corresponding to wavelength conversion section 24) of the preliminary reception processing section 3p, and the signals are amplified by an optical amplifier (corresponding to optical amplifiers 33a to 33c) of the preliminary reception processing section 3p. The wavelength multiplexed optical signal Sc is inputted to the demultiplexer 31p of the preliminary reception processing section 3p. The demultiplexer 31p splits the wavelength multiplexed optical signal Sc into a plurality of optical signals, and outputs the optical signals to the respective optical switches 39c.

The other wavelength multiplexed optical signals Sa, Sb are also inputted to demultiplexers (corresponding to demultiplexers 31a, 31b) of the preliminary reception processing section 3p. The demultiplexers split the wavelength multiplexed optical signals Sa, Sb into a plurality of optical signals, and output the optical signals to the optical switches 39a, 39b.

When selecting the preliminary transmission line 91 as the source of an optical signal, the optical switches 39a to 39c output the optical signals inputted to the demultiplexer 31p to the respective receivers 30a to 30c.

As described above, in the reception unit 3, the optical switches 39a to 39c are provided between the receivers 30a to 30c and the demultiplexers 31a to 31c, and the preliminary reception processing section 3p has the same configuration as the configuration including the demultiplexers 31a to 31c, 36, the optical amplifiers 33a to 33c, 35a, 35c, and the wavelength conversion section 34.

The control unit 1 of the transmission apparatus 8a is configured of a CPU circuit or the like, and controls the reception unit 3. The control unit 1 detects a fault of each of the wavelength multiplexed optical signals Sa to Sc, and switches the optical switches 39a to 39c according to the fault.

For example, when detecting failure of the optical amplifier 33a for the wavelength multiplexed optical signal Sa, the control unit 1 controls each of the optical switches 39a such that the source of the optical signal for each of the receivers 30a is switched from the active transmission line 90 to the preliminary transmission line 91. When detecting failure of the wavelength converter 34c for the wavelength multiplexed optical signal Sc, the control unit 1 controls each of the optical switches 29c such that the source of the optical signal for each of the receivers 30c is switched from the active transmission line 90 to the preliminary transmission line 91.

The control units 1 of the transmission apparatuses 8a, 8b share information on a fault about the wavelength multiplexed optical signals Sa to Sc by using a control channel. For this reason, each of the control units 1 may switch the optical switches 29a to 29c, 39a to 39c corresponding to the common wavelength multiplexed optical signals Sa to Sc. For example, when detecting the fault about the wavelength multiplexed optical signal Sa, the optical switch 29a in the transmission unit 2 and the optical switch 39a in the reception unit 3 select the preliminary transmission line 91. Thereby, among the wavelength multiplexed optical signals Sa to Sc, only the wavelength multiplexed optical signal Sa having the fault is transmitted through the preliminary transmission line 91.

However, for redundancy of all optical signals, the transmission system in this example requires the same number of optical switches 29a to 29c, 39a to 39c as the number of wavelengths (that is, the number of optical signals) used in all wavelength bands, between the transmitters 20a to 20c and the multiplexers 21a to 21c, and between the receivers 30a to 30c and the demultiplexers 31a to 31c.

The transmission system in this example requires the preliminary transmission processing section 2p and the preliminary reception processing section 3p. For this reason, the number of optical amplifiers 23a to 23c, 25a, 25c, 33a to 33c, 35a, 35c, the wavelength conversion section 24, 34, the multiplexers 21a to 21c, 26, and the demultiplexers 31a to 31c, 36 become twice.

Second Comparative Example

Figure 2:
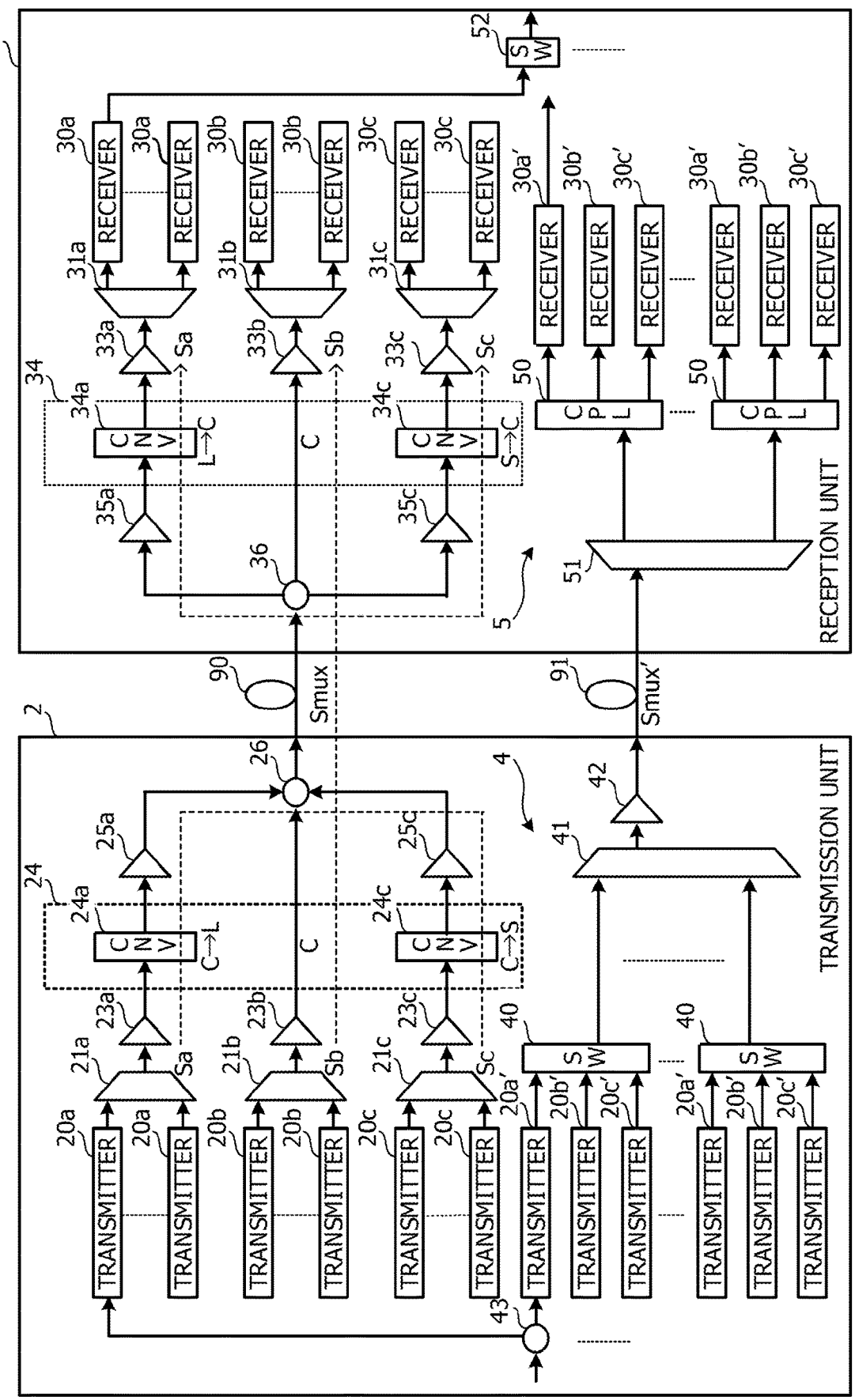
FIG. 2 is a configuration view illustrating a transmission system in Second comparative example.

FIG. 2 is a configuration view illustrating a transmission system in second comparative example. The same elements in FIG. 2 as those in FIG. 1 are given the same reference numerals, and description thereof is omitted. In FIG. 2, the control unit 1 is not illustrated.

The transmission system in this example is provided with a transmission processing section 4 in place of the preliminary transmission processing section 2p in First comparative example, and a reception processing section 5 in place of the preliminary reception processing section 3p in First comparative example. The transmission processing section 4 generates multiplexed light Smux', and transmits the multiplexed light Smux' to the reception processing section 5 through the preliminary transmission line 91.

The transmission processing section 4 has a plurality of transmitters 20a' to 20c', a plurality of optical switches (SW) 40, a multiplexer 41, an optical amplifier 42, and an optical coupler 43. The transmitters 20a' to 20c' have the same function as the transmitters 20a to 20c. The transmitters 20a' to 20c' generate optical signals having a wavelength in the C band, and output the optical signals to the optical switches 40.

The same client signal is inputted to an input port of each of the transmitter 20a and the transmitter 20a' via the optical coupler 43. Although not illustrated, the same client signal is inputted to an input port of each of the transmitter 20b and the transmitter 20b' via the optical coupler 43, and the same client signal is inputted to an input port of each of the transmitter 20c and the transmitter 20c' via the optical coupler 43. The transmitters 20a to 20c, 20a' to 20c' each convert the client signal into an optical signal, and outputs the optical signal.

The transmission system in this example do not includes the optical switches 29a to 29c in First comparative example. For this reason, the transmitters 20a to 20c are directly connected to the multiplexers 21a to 21c, respectively.

A set of transmitters 20a' to 20c' are connected to an input port of each of the optical switches 40. According to control of the control unit 1, each of the optical switches 40 selects one of the transmitters 20a' to 20c', and outputs the optical signal from the selected one of the transmitters 20a' to 20c' to the multiplexer 41.

The control unit 1 detects a fault about each of the wavelength multiplexed optical signals Sa to Sc, and switches each of the optical switches 40 according to the fault. For example, when detecting failure of the optical amplifier 23a for the wavelength multiplexed optical signal Sa, the control unit 1 controls each of the optical switches 40 so as to output the optical signal from each of the transmitters 20a'. When detecting failure of the wavelength converter 24c for the wavelength multiplexed optical signal Sc, the control unit 1 controls each of the optical switches 40 so as to output the optical signal from each of the transmitters 20c'.

The multiplexer 41 multiplexes optical signals outputted from the optical switches 40 to generate multiplexed light Smux', and outputs the multiplexed light Smux' to the optical amplifier 41. The optical amplifier 41 amplifies the multiplexed light Smux', and outputs the amplified multiplexed light Smux' to the preliminary transmission line 91.

The reception processing section 5 has a plurality of optical couplers 50, a demultiplexer 51, a plurality of optical switches 52, and receivers 30a' to 30c'. The multiplexed light Smux' is inputted from the preliminary transmission line 91 to the demultiplexer 51, and is demultiplexed. The demultiplexer 51 demultiplexes the multiplexed light Smux' by wavelength, and outputs the demultiplexed light from respective output ports to the optical couplers 50.

An output port of each of the optical couplers 50 is connected to a set of receivers 30a' to 30c'. Each of the optical couplers 50 splits the multiplexed light Smux' into the receivers 30a' to 30c'.

The receivers 30a' to 30c' have the same function as the receivers 30a to 30c. An output port of the receiver 30a and an output port of the receivers 30a' are connected to the common optical switch 52. Although not illustrated, an output port of the receiver 30b and an output port of the receiver 30b' are connected to the common optical switch 52, and an output port of the receiver 30c and an output port of the receiver 30c' are connected to the common optical switch 52.

According to control of the control unit 1, the optical switch 52 selects one of the receiver 30a and the receiver 30a', and outputs an optical signal outputted from the selected receiver 30a or 30a' to a client device not illustrated. Also, for the receivers 30b, 30b', an optical signal outputted from the receiver 30b or 30b' selected by the optical switches 52 is outputted from the optical switch 52 to the client device. Also, for the receivers 30c, 30c', an optical signal outputted from the receiver 30c or 30c' selected by the optical switch 52 is outputted from the optical switch 52 to the client device.

The control unit 1 detects a fault about each of the wavelength multiplexed optical signals Sa to Sc, and switches each of the optical switches 52 according to the fault. For example, when detecting failure of the optical amplifier 23a for the wavelength multiplexed optical signal Sa, the control unit 1 controls each of the optical switches 52 such that the optical signal of each of the receivers 30a' is outputted from the optical switch 52. When detecting failure of the wavelength converter 24c for the multiplexed optical signal Sc, the control unit 1 controls each of the optical switches 52 such that the optical signal of each of the transmitter 20c' is outputted from the optical switch 52.

With the above-mentioned configuration, the control unit 1 may switch each of the optical switches 40, 52 according to the fault about each of the wavelength multiplexed optical signals Sa to Sc, thereby transmitting only the wavelength multiplexed optical signal having the fault among the wavelength multiplexed optical signals Sa to Sc from the transmission unit 2 to the reception unit 3 via the preliminary transmission line 91. With this configuration, since the transmitters 20a to 20c, 20a' to 20c' and the receivers 30a to 30c, 30a' to 30c' are duplexed, a communication path between client devices adjacent to the transmission unit 2 and the reception unit 3 may be made redundant.

However, in the transmission system in this example, since the transmitters 20a to 20c, 20a' to 20c' and the receivers 30a to 30c, 30a' to 30c' are duplexed, the transmitters 20a to 20c, 20a' to 20c' and the receivers 30a to 30c, 30a' to 30c' that are twice as many as the number of wavelengths are provided.

Third Comparative Example

The transmission system in Second comparative example is provided with the optical switches 40, 52. However, a wavelength selection switch may be provided in place of the optical switches 40, 52.

Figure 3:
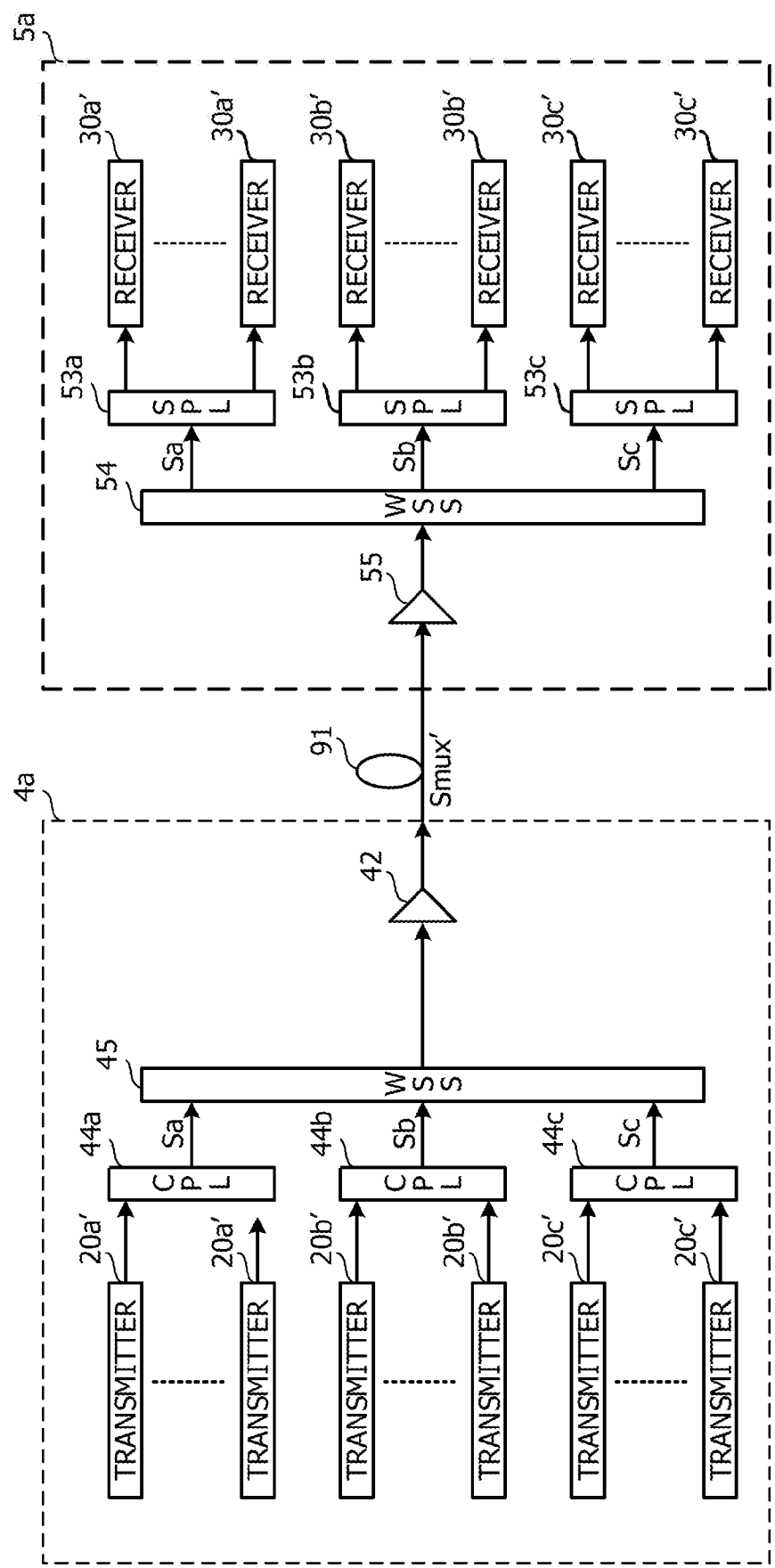
FIG. 3 is a configuration view illustrating a transmission system in Third comparative example.

FIG. 3 is a configuration view illustrating a transmission system in Third comparative example. FIG. 3 only illustrates a transmission processing section 4a in this example in place of the transmission processing section 4, and a reception processing section 5a in this example in place of the reception processing section 5. The same elements in FIG. 3 as those in FIG. 2 are given the same reference numerals, and description thereof is omitted.

The transmission processing section 4 has a plurality of transmitters 20a' to 20c', a plurality of optical couplers (SW) 44a to 44c, a wavelength selection switch (WSS) 45, an optical amplifier 42, and an optical coupler 43. The optical coupler 43 is not illustrated.

The plurality of transmitter 20a' are connected to an input port of the optical coupler 44a. The optical coupler 44a multiplexes optical signals inputted from the transmitters 20a' to generate the wavelength multiplexed optical signal Sa, and outputs the wavelength multiplexed optical signal Sa to the wavelength selection switch 45.

The plurality of transmitter 20b' are connected to an input port of the optical coupler 44b. The optical coupler 44b multiplexes optical signals inputted from the transmitters 20b' to generate the wavelength multiplexed optical signal Sb, and outputs the wavelength multiplexed optical signal Sb to the wavelength selection switch 45.

The plurality of transmitters 20c' are connected to an input port of the optical coupler 44c. The optical coupler 44c multiplexes optical signals inputted from the transmitters 20c' to generate the wavelength multiplexed optical signal Sc, and outputs the wavelength multiplexed optical signal Sc to the wavelength selection switch 45.

According to control of the control unit 1, the WSS 45 selects any of the wavelength multiplexed optical signals Sa to Sc inputted from the optical couplers 44a to 44c, and outputs the selected one of the wavelength multiplexed optical signals Sa to Sc to the optical amplifier 42. The wavelength multiplexed optical signals Sa to Sc outputted from the amplifier 42 are inputted to the preliminary transmission line 91 as the multiplexed light Smux'.

The control unit 1 detects a fault about each of the wavelength multiplexed optical signals Sa to Sc, and switches the wavelength multiplexed optical signals Sa to Sc to be inputted to the wavelength selection switch 45 according to the fault. For example, when detecting failure of the optical amplifier 23a for the wavelength multiplexed optical signal Sa, the control unit 1 controls the wavelength selection switch 45 such that the wavelength multiplexed optical signal Sa outputted from the optical coupler 44a is outputted from the wavelength selection switch 45. When detecting failure of the wavelength converter 24c for the wavelength multiplexed optical signal Sc, the control unit 1 controls the wavelength selection switch 45 such that the wavelength multiplexed optical signal Sc outputted from the optical coupler 44c is outputted from the wavelength selection switch 45.

The reception processing section 5a has a plurality of optical switches 52, a wavelength selection switch 54, an optical amplifier 55, optical splitters 53a to 53c, and receivers 30a' to 30c'. The optical switches 52 is not illustrated. The multiplexed light Smux' is inputted from the preliminary transmission line 91 to the optical amplifier 55, and is amplified. The optical amplifier 55 amplifies the multiplexed light Smux', and outputs the amplified multiplexed light Smux' to the wavelength selection switch 54.

According to control of the control unit 1, the wavelength selection switch 54 selects one of the optical splitters 53a to 53c, and outputs the multiplexed light Smux' to the selected one of the optical splitters 53a to 53c. Thereby, according to the fault, the wavelength multiplexed optical signals Sa to Sc are outputted from the wavelength selection switch 54 to the optical splitters 53a to 53c, respectively.

The control unit 1 detects a fault about each of the wavelength multiplexed optical signals Sa to Sc, and switches a destination of the multiplexed light Smux' from the wavelength selection switch 54 according to the fault. For example, when detecting failure of the optical amplifier 23a for the wavelength multiplexed optical signal Sa, the control unit 1 controls the wavelength selection switch 54 such that the multiplexed light Smux' is outputted from the wavelength selection switch 54 to the optical splitter 53a. When detecting failure of the wavelength converter 24c for the wavelength multiplexed optical signal Sc, the control unit 1 controls the wavelength selection switch 54 such that the multiplexed light Smux' is outputted from the wavelength selection switch 54 to the optical splitter 53c.

Thereby, one of the wavelength multiplexed optical signals Sa to Sc is inputted to the corresponding one of the optical splitters 53a to 53c. The optical splitter 53a demultiplexes the wavelength multiplexed optical signal Sa in unit of wavelength, and outputs the demultiplexed optical signals to the receivers 30a'. The optical splitter 53b demultiplexes the wavelength multiplexed optical signal Sb in unit of wavelength, and outputs the demultiplexed optical signals to the receivers 30b'. The optical splitter 53c demultiplexes the wavelength multiplexed optical signal Sc in unit of wavelength, and outputs the demultiplexed optical signals to the receivers 30c'.

With the above-mentioned configuration, the control unit 1 may switch each of the wavelength selection switches 45, 54 according to the fault about each of the wavelength multiplexed optical signals Sa to Sc, thereby transmitting only the wavelength multiplexed optical signal having the fault among the wavelength multiplexed optical signals Sa to Sc from the transmission unit 2 to the reception unit 3 via the preliminary transmission line 91. With this configuration, since the transmitters 20a to 20c, 20a' to 20c' and the receivers 30a to 30c, 30a' to 30c' are duplexed, a communication path between client devices adjacent to the transmission unit 2 and the reception unit 3 may be made redundant.

However, in the transmission system in this example, since the transmitters 20a to 20c, 20a' to 20c' and the receivers 30a to 30c, 30a' to 30c' are duplexed, the transmitters 20a to 20c, 20a' to 20c' and the receivers 30a to 30c, 30a' to 30c' that are twice as many as the number of wavelengths are provided.

Fourth Comparative Example

Since the transmission system in First comparative example is provided with the optical switches 29a to 29b in unit of wavelength, the same number of optical switches 29a to 29b as the number of all optical signals are provided. However, an optical switch may be provided for each set of optical signals having different wavelength bands.

Figure 4:
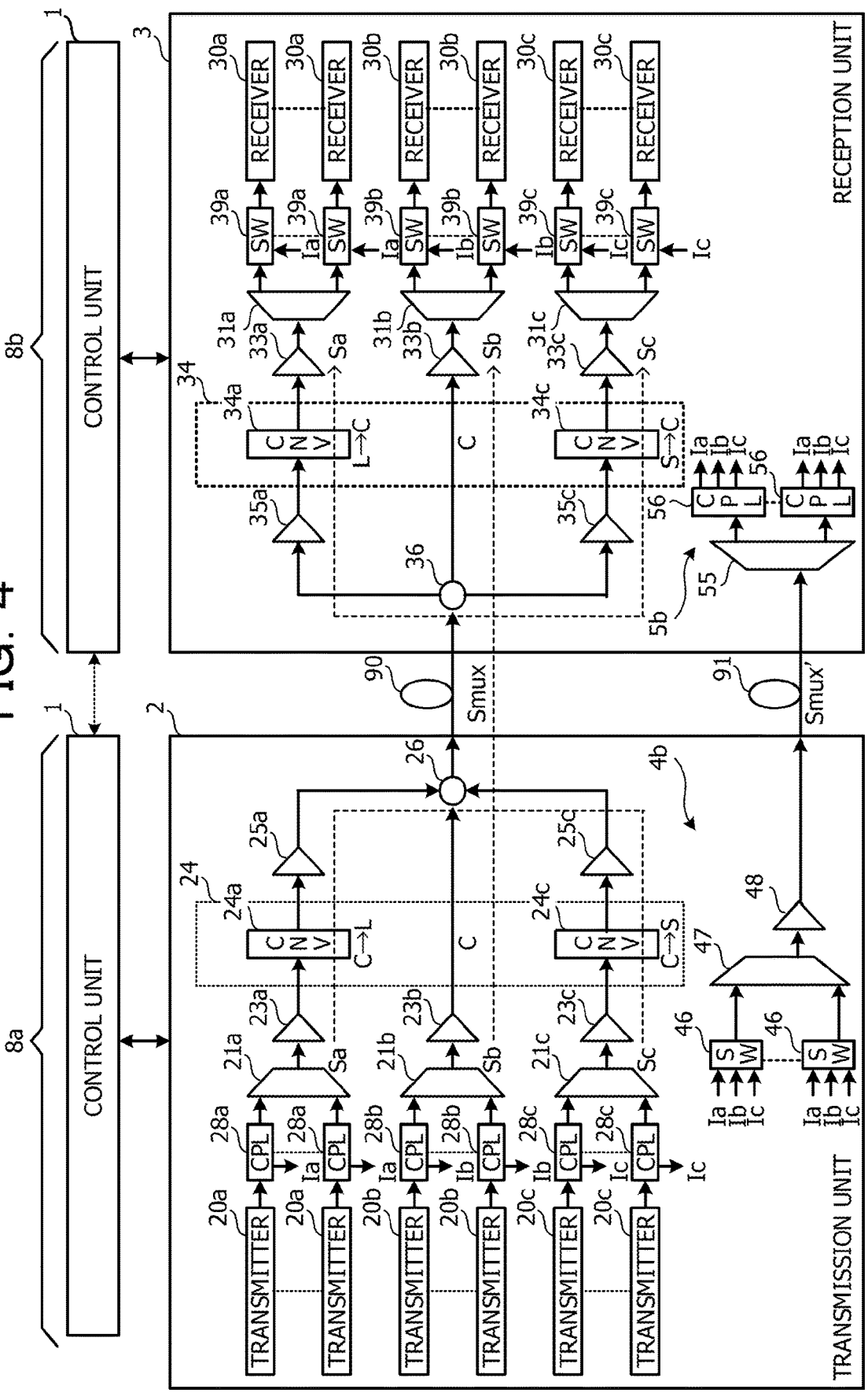
FIG. 4 is a configuration view illustrating a transmission system in Fourth comparative example.

FIG. 4 is a configuration view illustrating a transmission system in Fourth example. The same elements in FIG. 4 as those in FIG. 1 are given the same reference numerals, and description thereof is omitted.

The transmission system in this example is provided with optical couplers (CPL) 28a to 28c in place of the optical switches 29a to 29b in First comparative example. A transmission processing section 4b in this example is provided in place of the transmission processing section 2p in First comparative example, and a reception processing section 5b in this example is provided in place of the preliminary reception processing section 3p in First comparative example.

The transmission processing section 4b has a plurality of optical switches (SW) 46, a multiplexer 47, and an optical amplifier 48. The reception processing section 5b has a demultiplexer 55 and an optical coupler 56.

The optical coupler 28a splits an optical signal Ia inputted from the transmitter 20a, and outputs the split output signals to the multiplexer 21a and the optical switch 46. The optical coupler 28b split the optical signal Ib inputted from the transmitter 20b, and outputs the split output signals to the multiplexer 21b and the optical switch 46. The optical coupler 28c splits an optical signal Ic inputted from the transmitter 20c, and outputs the split output signals to the multiplexer 21c and the optical switch 46.

For this reason, three optical signals Ia to Ic having different wavelength bands are inputted to each of the optical switches 46. The optical switch 46 has three input ports and one output port, selects one of the optical signals Ia to Ic inputted through the input port, and outputs the selected one of the optical signals Ia to Ic to the multiplexer 47 through the output port. According to control of the control unit 1, each of the optical switches 46 selects one of the optical signals Ia to Ic to be outputted.

The control unit 1 detects a fault about each of the wavelength multiplexed optical signals Sa to Sc, and switches each of the optical switches 46 according to the fault. For example, when detecting failure of the optical amplifier 23a for the wavelength multiplexed optical signal Sa, the control unit 1 controls each of the optical switches 46 so as to output the optical signal Ia. When detecting failure of the wavelength converter 24c for the wavelength multiplexed optical signal Sc, the control unit 1 controls each of the optical switches 46 so as to output the optical signal Ic.

The multiplexer 47 multiplexes the optical signals Ia to Ic inputted from each of the optical switches 46 to generate multiplexed light Smux'. The multiplexed light Smux' includes any of the optical signal Ia from the transmitter 20a, the optical signal Ib from the transmitter 20b, and the optical signal Ic from the transmitter 20c. The multiplexed light Smux' is inputted from the multiplexer 47 to the optical amplifier 48, and is amplified. The amplified multiplexed light Smux' is inputted to the preliminary transmission line 91.

The multiplexed light Smux' is inputted from the preliminary transmission line 91 to the demultiplexer 55. The demultiplexer 55 demultiplexes the multiplexed light Smux' in unit of wavelength, and outputs the demultiplexed light to each of the optical coupler 56. Each of the optical coupler 56 outputs the optical signals Ia to Ic to the optical switches 39a to 39c. In the case where the optical switch 46 outputs the optical signal Ia, the optical coupler 56 outputs the optical signal Ia, and in the case where the optical switches 46 outputs the optical signal Ic, the optical coupler 56 outputs the optical signal Ic. As in First comparative example, the optical switches 39a to 39c are switched by the control unit 1.

With the above-mentioned configuration, since the optical switches 46 select one of the three optical signals Ia to Ic, the number of optical switches is reduced as compared with First comparative example and however, the same number of optical switches 46 as the number of wavelengths in each wavelength band are required. In the transmission system in this example, optical switches may be provided in place of the optical couplers 28a to 28c, and an optical coupler may be provided in place of the multiplexer 47. An optical switch may be provided in place of the demultiplexer 55, and optical couplers may be provided in place of the optical switches 39a to 39c.

As described above, the transmission system in each of the comparative examples becomes large, leading to a cost problem.

Thus, the transmission system in embodiments is provided with an optical switch that selects the destination and the source of each of the wavelength multiplexed optical signals Sa to Sc in place of the optical switches 29a to 29c, 39a to 39c that selects the destination and the source of each optical signal. For this reason, the number of optical switches is reduced as compared with the comparative examples.

First Embodiment

Figure 5:
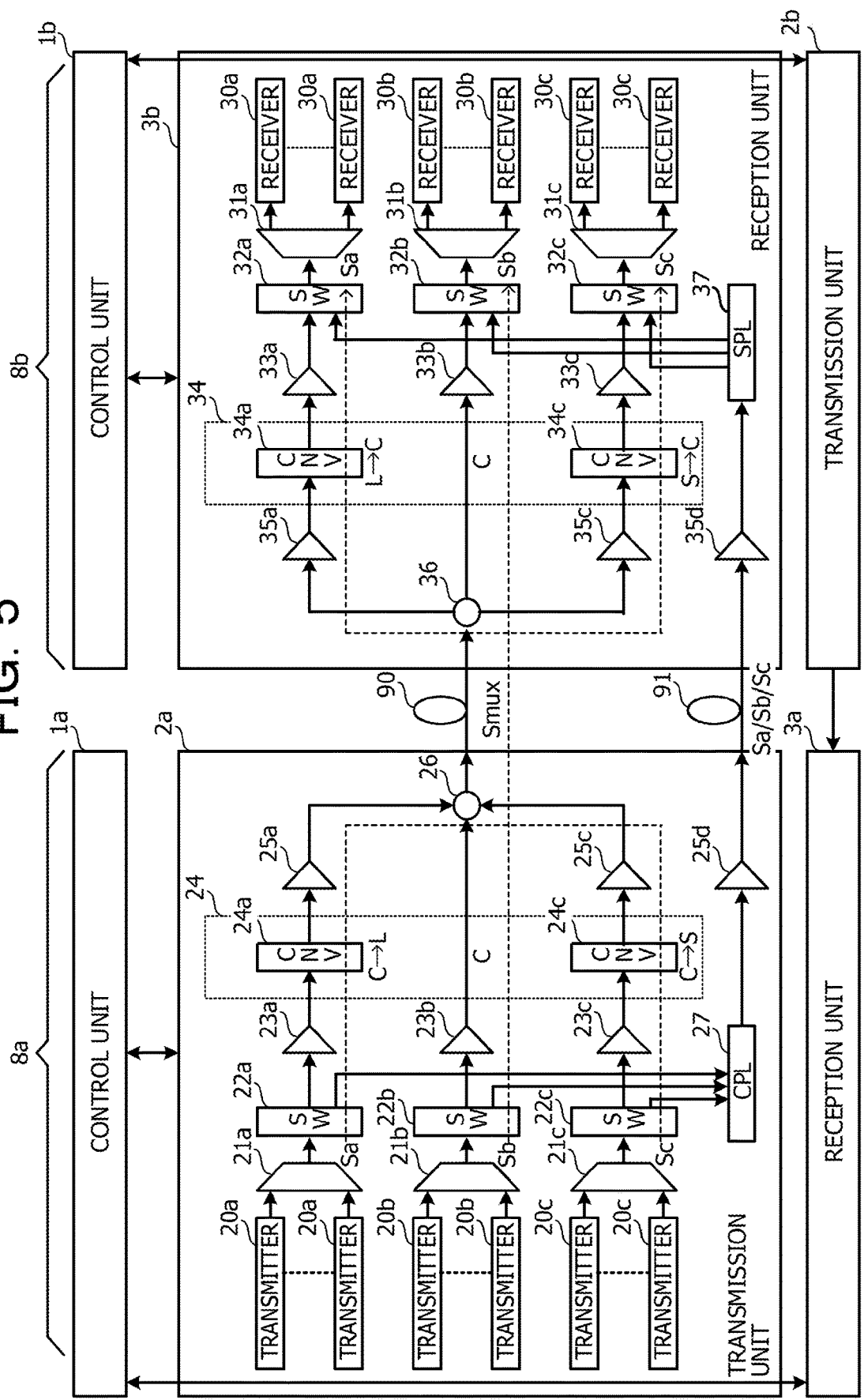
FIG. 5 is a configuration view illustrating a transmission system in First embodiment.

FIG. 5 is a configuration view illustrating a transmission system in First embodiment. The same elements in FIG. 5 as those in FIG. 1 are given the same reference numerals, and description thereof is omitted. The transmission method in the embodiment is performed by below-mentioned processing of the transmission system.

The transmission apparatus 8a has a control unit 1a, a transmission unit 2a, and a reception unit 3a, and the transmission apparatus 8b has a control unit 1b, a transmission unit 2b, and a reception unit 3b. As represented by dotted lines, the transmission unit 2a multiplexes the wavelength multiplexed optical signals Sa to Sc in the C band, the L band, and the S band to generate multiplexed light Smux, and transmits the multiplexed light Smux to the reception unit 3b through the active transmission line 90. The transmission apparatus 8a is an example of a transmission apparatus, and the transmission apparatus 8b is an example of a reception apparatus.

Multiplexed light is also transmitted from the transmission unit 2b to the reception unit 3a. The transmission processing is the same as the transmission processing from the transmission unit 2a to the reception unit 3b. The transmission units 2a, 2b have the same configuration, and the reception units 3a, 3b have the same configuration and however, FIG. 5 illustrates only the transmission unit 2a and the reception unit 3b. The control units 1a, 1b also have the same configuration. However, in following description, since one control unit 1a controls the transmission unit 2a, the other control unit 1b controls the reception unit 3b, the control units 1a, 1b are discriminated from each other.

For example, the control units 1a, 1b, the transmission units 2a, 2b, and the reception units 3a, 3b each are configured of a circuit board on which a plurality of electronic components and optical components are mounted, and are implemented in slots of housings of the transmission apparatuses 8a, 8b. The control units 1a, 1b, the transmission units 2a, 2b, and the reception units 3a, 3b each are connected to a corresponding wiring board in the transmission apparatuses 8a, 8b via an electrical connector, and exchange data via the wiring board.

The transmission unit 2a has a plurality of transmitters 20a to 20c, a plurality of multiplexers 21a to 21c, 26, a plurality of optical switches (SW) 22a to 22c, a plurality of optical amplifiers 23a to 23c, 25a, 25c, 25d, a wavelength conversion section 24, and an optical coupler (CPL) 27.

Unlike the comparative examples, the transmitters 20a to 20c are directly connected to the multiplexers 21a to 21c, respectively. The multiplexers 21a to 21c wavelength-multiplex a plurality of optical signals to generate the plurality of wavelength multiplexed optical signals Sa to Sc in the C band. The multiplexers 21a to 21c output the wavelength multiplexed optical signals Sa to Sc to the optical switches 22a to 22c, respectively. The C band is an example of a first wavelength band.

The optical switches 22a to 22c are connected to in later stages of the multiplexers 21a to 21c, respectively, and receive inputs of the wavelength multiplexed optical signals Sa to Sc, respectively. The optical switches 22a to 22c are an example of a plurality of first selection sections, and select a destination of each of the wavelength multiplexed optical signals Sa to Sc from the active transmission line 90 and the preliminary transmission line 91. The active transmission line 90 is an example of a first transmission line, and the preliminary transmission line 91 is an example of a second transmission line.

The optical switches 22a to 22c is controlled by the control unit 1a. When detecting a fault about any of the wavelength multiplexed optical signals Sa to Sc, the control unit 1a controls each of the optical switches 22a to 22c such that only the wavelength multiplexed optical signal having the fault among the wavelength multiplexed optical signals Sa to Sc is outputted to the preliminary transmission line 91.

For example, when detecting a fault about the wavelength multiplexed optical signal Sc, the control unit 1a switches the destination of the wavelength multiplexed optical signal Sc from the optical switch 22c to the preliminary transmission line 91, and keeps the destination of the wavelength multiplexed optical signals Sa, Sb from the other optical switches 22a, 22b to be the active transmission line 90. Thereby, the optical switches 22c outputs the wavelength multiplexed optical signal Sc to the optical coupler 27, and the other optical switches 22a, 22b output the wavelength multiplexed optical signals Sa, Sb to the optical amplifiers 23a, 23b.

When the preliminary transmission line 91 is selected as the destination of the wavelength multiplexed optical signals Sa to Sc, the optical switches 22a to 22c output the wavelength multiplexed optical signals Sa to Sc to the optical coupler 27. Since the control unit 1a switches the destination of only one of the optical switches 22a to 22c to the preliminary transmission line 91 according to the fault, one of the wavelength multiplexed optical signals Sa to Sc at maximum is inputted to the optical coupler 27.

The optical coupler 27 is an example of an output section, and outputs one of the wavelength multiplexed optical signals Sa to Sc to be outputted to preliminary transmission line 91, to the preliminary transmission line 91. One multiplexed optical signal having a fault among the wavelength multiplexed optical signals Sa to Sc is outputted from the optical coupler 27 to the optical amplifier 25d. The optical amplifier 25d is, for example, an EDFA, and amplifies the wavelength multiplexed optical signals Sa to Sc to compensate power loss generated by the optical coupler 27. The wavelength multiplexed optical signals Sa to Sc are outputted from the optical amplifier 25d to the preliminary transmission line 91, and are inputted to the reception unit 3b through the preliminary transmission line 91.

When the active transmission line 90 is selected as the destination of the wavelength multiplexed optical signals Sa to Sc, the optical switches 22a to 22c output the wavelength multiplexed optical signals Sa to Sc to the optical amplifiers 23a to 23c, respectively. The optical amplifiers 23a to 23c amplify the wavelength multiplexed optical signals Sa to Sc, respectively, and output the amplified signals to the wavelength conversion section 24.

The wavelength conversion section 24 is an example of a first wavelength conversion section, and converts the wavelength bands of the wavelength multiplexed optical signals Sa to Sc to be outputted to the active transmission line 90 into different wavelength bands. More specifically, the wavelength converter 24a converts the wavelength band of the wavelength multiplexed optical signal Sa from the C band to the L band, and the wavelength converter 24c converts the wavelength band of the wavelength multiplexed optical signal Sc from the C band to the S band.

Consequently, the wavelength bands of the multiplexed optical signals Sa to Sc outputted to the active transmission line 90 are different from each other, enabling wavelength multiplexing of the multiplexer 26. The wavelength multiplexed optical signal Sb in the C band is not wavelength-converted. However, in the case where the original wavelength band is the wavelength band other than the C band, wavelength conversion is performed. Each of the wavelength multiplexed optical signals Sa to Sc to be outputted to the active transmission line 90 is outputted from the wavelength conversion section 24 to the multiplexer 26.

The multiplexer 26 is an example of a multiplexing section, and multiplexes the wavelength multiplexed optical signals Sa to Sc subjected to wavelength conversion to generate multiplexed light Smux, and outputs the multiplexed light Smux to the active transmission line 90. The multiplexed light Smux is inputted to the reception unit 3b through the active transmission line 90.

The reception unit 3b has a plurality of receivers 30a to 30c, a plurality of demultiplexers 31a to 31c, 36, optical amplifiers 33a to 33c, 35a, 35c, 35d, a wavelength conversion section 34, a plurality of optical switches 32a to 32c, and an optical splitter (SPL) 37.

The multiplexed light Smux is inputted to the demultiplexer 36 through the active transmission line 90. The demultiplexer 36 is an example of a demultiplexing section, and demultiplexes the multiplexed light Smux inputted through the active transmission line 90 is demultiplexed into the wavelength multiplexed optical signals Sa to Sc to be outputted to the active transmission line 90. For this reason, in a later stage of the demultiplexer 36, the wavelength multiplexed optical signals Sa to Sc are processed by wavelength band.

The wavelength multiplexed optical signals Sa to Sc are outputted from the demultiplexer 36 to the wavelength conversion section 34. The wavelength conversion section 34 is an example of a second wavelength conversion section, and converts the wavelength band of each of the wavelength multiplexed optical signals Sa to Sc demultiplexed from the multiplexed light Smux into the C band. That is, the wavelength conversion section 34 converts the wavelength band of each of the wavelength multiplexed optical signals Sa to Sc into a common wavelength band. The wavelength multiplexed optical signal Sb is not subjected to wavelength conversion. However, for example, if the converted wavelength band is the wavelength band other than the C band, wavelength multiplexed optical signal Sb is subjected to wavelength conversion. The wavelength multiplexed optical signals Sa to Sc are inputted from the wavelength conversion section 34 to the optical switches 32a to 32c.

The wavelength multiplexed optical signals Sa to Sc outputted to the preliminary transmission line 91 are inputted to the optical amplifier 35d. The optical amplifier 35d amplifies the wavelength multiplexed optical signals Sa to Sc to compensate power loss in the preliminary transmission line 91. The optical amplifier 35d outputs the wavelength multiplexed optical signals Sa to Sc to the optical splitter 37. The optical splitter 37 splits the wavelength multiplexed optical signals Sa to Sc, and outputs the wavelength multiplexed optical signals Sa to Sc to the optical switches 32a to 32c, respectively. Thereby, the wavelength multiplexed optical signals Sa to Sc relating to the fault are inputted to the optical switches 32a to 32c, respectively.

Unlike the comparative examples, in the previous stage of the demultiplexers 31a to 31c, the optical switches 32a to 32c are connected to the wavelength conversion section 34 and the optical splitter 37. The optical switches 32a to 32c are an example of a plurality of second selection sections, and select the source of the wavelength multiplexed optical signals Sa to Sc to the demultiplexers 31a to 31c from the wavelength conversion section 34 and the preliminary transmission line 91. That is, the optical switches 32a to 32c select the source of the wavelength multiplexed optical signals Sa to Sc from the active transmission line 90 and the preliminary transmission line 91.

The optical switches 32a to 32c is controlled by the control unit 1b. When detecting a fault about any of the wavelength multiplexed optical signals Sa to Sc, the control unit 1b controls the optical switches 32a to 32c such that only the wavelength multiplexed optical signal having the fault among the wavelength multiplexed optical signals Sa to Sc is inputted from the preliminary transmission line 91 to the corresponding one of the demultiplexers 31a to 31c.

For example, when detecting a fault about the wavelength multiplexed optical signal Sc, the control unit 1b switches the source of the optical switch 32c to the preliminary transmission line 91, and keeps the source of the other optical switches 32a, 32b to be the active transmission line 90. Thereby, the demultiplexer 31c receives the wavelength multiplexed optical signal Sc from the preliminary transmission line 91, and the other demultiplexers 31a, 31b receive the wavelength multiplexed optical signals Sa, Sb from the active transmission line 90, that is, the wavelength conversion section 34.

The demultiplexers 31a to 31c is an example of a plurality of split sections, and split each of the wavelength multiplexed optical signals Sa to Sc into a plurality of optical signals. Thereby, the receivers 30a to 30c may receive the optical signals.

In transmission apparatus 8a, the control unit 1a monitors the optical amplifiers 23a to 23c, 25a, 25c, and the wavelength converters 24a, 24c to detect a fault about the wavelength multiplexed optical signals Sa to Sc.

For example, for fault detection, the wavelength converters 24a, 24c are provided with optical components such as an optical channel monitor, a photo diode, and an optical filter. For this reason, power decrease and wavelength deviation of excitation light in the wavelength converter 24a, 24bc and the wavelength converters 24a, 24c, power decrease and wavelength deviation of the wavelength multiplexed optical signals Sa, Sc after wavelength conversion, and power increase of leaked light of excitation light may be detected as failures and then, an alarm may be outputted to the control unit 1a.

In the same manner, the optical amplifiers 23a to 23c, 25a, 25c also detect failure, and outputs an alarm to the control unit 1a. Further, the optical amplifiers 23a to 23c detect the presence/absence of input light, thereby detecting signal interruption of each of the wavelength multiplexed optical signals Sa to Sc, and output an alarm to the control unit 1a.

For example, the control unit 1a detects signal interruption and apparatus failure about each of the wavelength multiplexed optical signals Sa to Sc. When detecting failure about any of the optical amplifiers 23a, 25a and the wavelength converter 24a, the control unit 1a detects an apparatus failure about the wavelength multiplexed optical signal Sa, and when detecting failure of the optical amplifier 23b, the control unit 1a detects an apparatus failure about the wavelength multiplexed optical signal Sb. When detecting failure of a fault about the optical amplifiers 23c, 25c and the wavelength converter 24c, the control unit 1a detects an apparatus failure about the wavelength multiplexed optical signal Sc. Further, the control unit 1a detects signal interruption of the wavelength multiplexed optical signals Sa to Sc according to the alarm of signal interruption from the optical amplifiers 23a to 23c.

In the transmission apparatus 8b, the control unit 1b monitors the optical amplifiers 33a to 33c, 35a, 35c, and the wavelength converters 34a, 34c, and detects a fault such as failure. The optical amplifiers 33a to 33c, 35a, 35c and the wavelength converters 34a, 34c detect the failure by the above-mentioned means, and output the alarm to the control unit 1b. The optical amplifiers 33a to 33c detect signal interruption of the wavelength multiplexed optical signals Sa to Sc, and output the alarm to the control unit 1b.

For example, the control unit 1b detects signal interruption and apparatus failure for each of the wavelength multiplexed optical signals Sa to Sc. When detecting failure of each of the optical amplifiers 33a, 35a and the wavelength converter 34a, the control unit 1b detects apparatus failure about the wavelength multiplexed optical signal Sa, and when detecting apparatus failure about the optical amplifier 33b, the control unit 1b detects apparatus failure about the wavelength multiplexed optical signal Sb.

When detecting failure of any of the optical amplifiers 33c, 35c and the wavelength converter 34c, the control unit 1b detects apparatus failure of the wavelength multiplexed optical signal Sc. Further, the control unit 1b detects signal interruption of the wavelength multiplexed optical signals Sa to Sc according to the alarm on signal interruption from the optical amplifiers 33a to 33c. The apparatus failure and signal interruption are an example of the fault about the wavelength multiplexed optical signals Sa to Sc.

The control units 1a, 1b share the alarm by communication. For example, the alarm may be transmitted from one control unit 1a, 1b to the other control unit 1a, 1b using monitoring signal light of the optical amplifiers 23a to 23c, 25a, 25c, 33a to 33c, 35a, 35c. For example, the monitoring signal light is transmitted from the optical amplifiers 23a to 23c, 25a, 25c of the transmission units 2a, 2b to the optical amplifiers 33a to 33c, 35a, 35c of the reception units 3b, 3a for each of the wavelength multiplexed optical signals Sa to Sc.

For example, when failure has occurred in the optical amplifier 25c, the optical amplifier 25c outputs the alarm notifying the failure to the control unit 1a. When receiving the alarm, the control unit 1a inserts the alarm into the monitoring signal light of the other optical amplifier 25a. The alarm is included in the wavelength multiplexed optical signal Sa, and is received by the optical amplifier 35a of the reception unit 3b. The optical amplifier 35a outputs the alarm to the control unit 1b. Thereby, the control unit 1b detects apparatus failure about the wavelength multiplexed optical signal Sc.

The alarm occurring in the reception unit 3b is transmitted from the transmission unit 2b to the other reception unit 3a in the reverse direction. For example, when receiving an alarm from the optical amplifiers 33a to 33c, 35a, 35c, the control unit 1b transmits the alarm to the other reception unit 3a using monitoring signal light of the optical amplifier in the transmission unit 2b, and outputs the alarm from the reception unit 3a to the control unit 1a.

In this manner, the control units 1a, 1b transfer the alarm to each other. The control units 1a, 1b may multiplex monitoring signal light of the wavelength multiplexed optical signals Sa to Sc into one monitoring signal light, and transmit the monitoring signal light.

Next, switching of the transmission line for the wavelength multiplexed optical signals Sa to Sc will be described.

Figure 6:
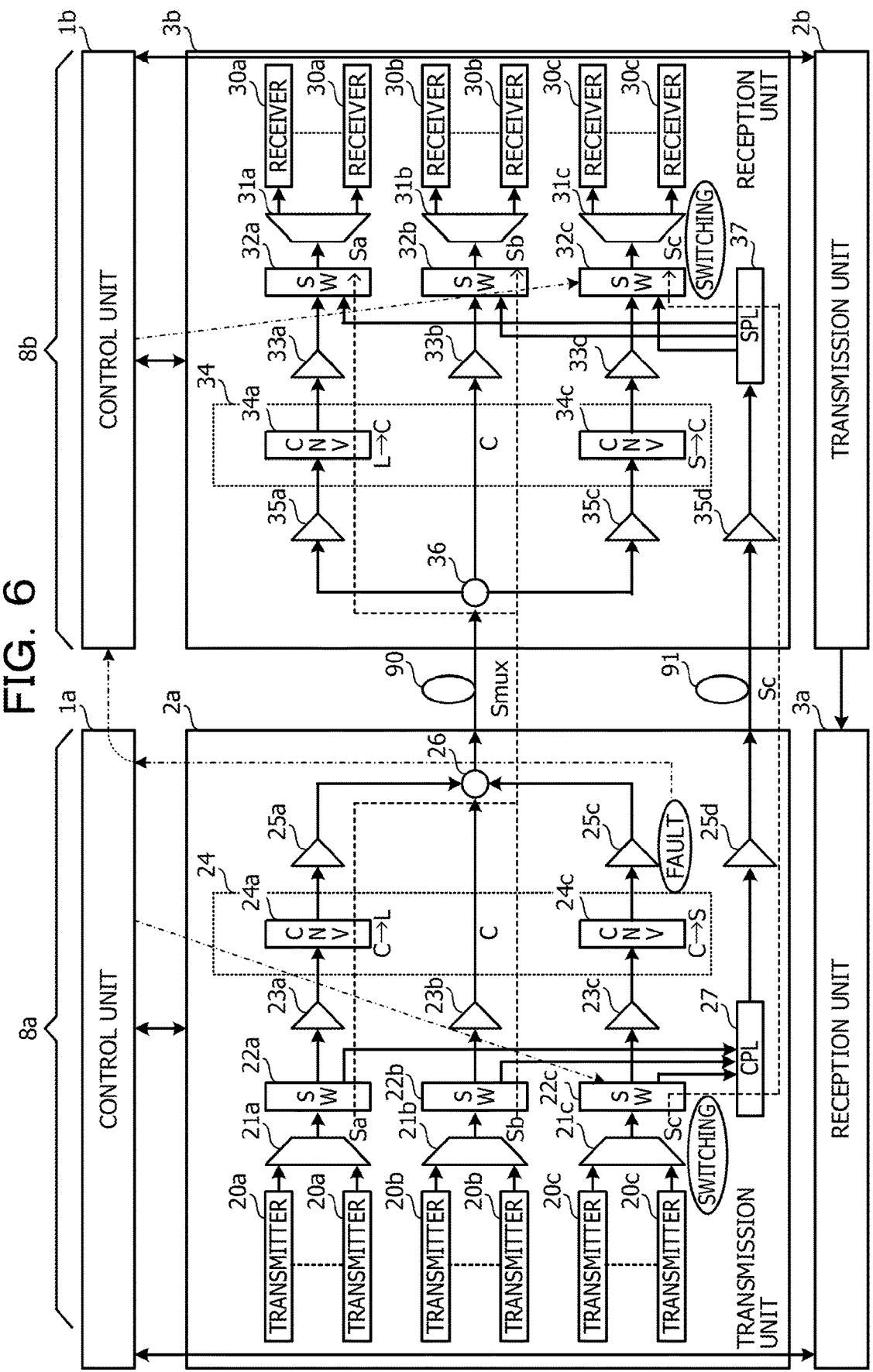
FIG. 6 is a view illustrating an example of switching of a transmission line.

FIG. 6 is a view illustrating an example of switching of the transmission line. The same elements in FIG. 6 as those in FIG. 5 are given the same reference numerals, and description thereof is omitted.

Dotted lines represent paths for the wavelength multiplexed optical signals Sa to Sc. In this embodiment, due to failure of the optical amplifier 25c, the control units 1a, 1b switch the path for the wavelength multiplexed optical signal Sc from the active transmission line 90 to the preliminary transmission line 91.

When failure is detected, the optical amplifier 25c outputs an alarm to the control unit 1a. The control unit 1a transmits the alarm to the other control unit 1b by means of monitoring signal light. The control units 1a, 1b detect apparatus failure about the multiplexed optical signal Sc, based on the alarm.

The control unit 1a controls the optical switch 22c corresponding to the wavelength multiplexed optical signal Sc such that the destination of the wavelength multiplexed optical signal Sc is switched from the active transmission line 90 to the preliminary transmission line 91 (see broken lines). Thereby, the wavelength multiplexed optical signal Sc is outputted from the optical switch 22c to the optical coupler 27 and then, is inputted from the optical coupler 27 to the preliminary transmission line 91 through the optical amplifier 25d.

The control unit 1a controls the optical switches 22a, 22b corresponding to the other wavelength multiplexed optical signals Sa, Sb such that the destination of the wavelength multiplexed optical signals Sa, Sb is kept to be the active transmission line 90. Thereby, the wavelength multiplexed optical signal Sa is outputted from the optical switch 22a to the optical amplifier 23a, and the wavelength multiplexed optical signal Sb is outputted from the optical switch 22b to the optical amplifier 23b. For this reason, the wavelength multiplexed optical signals Sa, Sb are inputted to the multiplexer 26, and are outputted to the active transmission line 90 as multiplexed light Smux.

The control unit 1b controls the optical switch 32c corresponding to the wavelength multiplexed optical signal Sc such that the source of the wavelength multiplexed optical signal Sc is switched from the active transmission line 90 to the preliminary transmission line 91 (see broken lines). Thereby, the wavelength multiplexed optical signal Sc inputted from the preliminary transmission line 91 is inputted from the optical splitter 37 to the optical switch 32c and then, is inputted from the optical switch 32c to the demultiplexer 31c.

The control unit 1b controls the optical switches 32a, 32b corresponding to the other wavelength multiplexed optical signals Sa, Sb having no fault such that the source of the wavelength multiplexed optical signals Sa, Sb is kept to be the active transmission line 90. Thereby, the wavelength multiplexed optical signals Sa, Sb are inputted from the optical switches 32a, 32b to the demultiplexers 31a, 31b, respectively.

In this manner, the path for the wavelength multiplexed optical signal Sc with a fault is switched from the active transmission line 90 to the preliminary transmission line 91, and the path for the other wavelength multiplexed optical signals Sa, Sb without any fault is kept to be the active transmission line 90. For this reason, even if a fault occurs in the optical amplifier 25c, transmission of each of the wavelength multiplexed optical signals Sa to Sc from the transmission unit 2a to the reception unit 3b may be continued.

In the transmission system in this embodiment, the optical switches 22a to 22c in the transmission unit 2a select the destination of the wavelength multiplexed optical signals Sa to Sc from the active transmission line 90 and the preliminary transmission line 91. Thus, in the transmission unit 2a, an optical switch do not have to be provided for each of the wavelength multiplexed optical signals Sa to Sc. The optical switches 32a to 32c in the reception unit 3b select the source of the wavelength multiplexed optical signals Sa to Sc to the demultiplexers 31a to 31c from the active transmission line 90, that is, the wavelength conversion section 34 and the preliminary transmission line 91. Thus, in the reception unit 3b, an optical switch do not have to be provided for each of the wavelength multiplexed optical signals Sa to Sc.

For this reason, the number of optical switches in the transmission unit 2a and the reception unit 3b is reduced as compared with the comparative examples. Further, unlike the comparative examples, the transmission unit 2a is not necessarily provided with the preliminary transmission processing section 2p, and the reception unit 3b is not necessarily provided with the preliminary reception processing section 3p. Accordingly, the transmission system in this embodiment may reduce the number of optical switches as well as the number of optical amplifiers, downsizing redundant configuration.

In the transmission unit 2a, the optical coupler 27 is connected between the optical switches 22a to 22c and the preliminary transmission line 91, and in the reception unit 3b, the optical splitter 37 is connected between the preliminary transmission line 91 and the optical switches 32a to 32c. For this reason, even if a fault about the wavelength multiplexed optical signals Sa to Sc occurs, the transmission unit 2a and the reception unit 3b may transmit/receive the wavelength multiplexed optical signals Sa to Sc through the preliminary transmission line 91 more easily by using the optical coupler 27 and the optical splitter 37.

The transmission unit 2a may be provided with, in place of the optical coupler 27, another optical switch for selecting the optical switches 22a to 22c as the source of the wavelength multiplexed optical signals Sa to Sc. The reception unit 3b may be provided with, in place of the optical splitter 37, another optical switch for selecting the optical switches 32a to 32c as the destination of the wavelength multiplexed optical signals Sa to Sc. In this case, each of the control units 1a, 1b controls another optical switch according to a fault.

In the transmission system in this embodiment, since the wavelength conversion section 24, 34 convert the wavelength band of the wavelength multiplexed optical signals Sa, Sc, the transmitters 20a to 20c and the receivers 30a to 30c may transmit/receive the wavelength multiplexed optical signals Sa to Sc in the C band. For this reason, the transmitters 20a to 20c, the receivers 30a to 30c, the multiplexers 21a to 21c, the demultiplexers 31a to 31c, and the optical amplifiers 23a to 23c, 33a to 33c are each may be configured of an inexpensive C band-compatible apparatus.

Further, the optical coupler 27 receives inputs of the wavelength multiplexed optical signals Sa to Sc in the C band, and the optical splitter 37 outputs the wavelength multiplexed optical signals Sa to Sc in the C band. For this reason, the optical amplifiers 25d, 35d connected to the preliminary transmission line 91 may be also configured as a C band-compatible apparatus. In the transmission system in this embodiment, the wavelength multiplexed optical signals Sa to Sc in the three wavelength bands are transmitted. However, the present disclosure is not limited to this, and the wavelength multiplexed optical signals in four or more wavelength bands may be transmitted by adding any suitable number of transmitter, receiver, multiplexer, demultiplexer, optical switch, optical amplifier, wavelength converter, and so forth.

Next, the configuration and operation of the control units 1a, 1b will be described. The control units 1a, 1b have the same configuration, and serve to monitor the transmission units 2a, 2b and the reception unit 3a, 3b, respectively.

Figure 7:
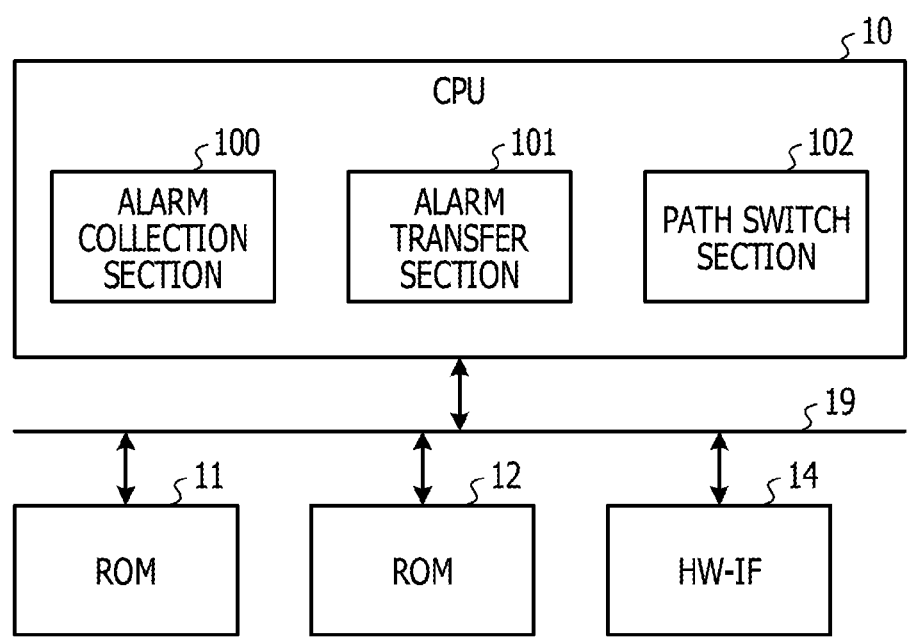
FIG. 7 is a configuration view illustrating an example of a control unit.

FIG. 7 is a configuration view illustrating an example of the control units 1a, 1b. The control units 1a, 1b each have a CPU 10, a ROM (Read Only Memory) 11, a RAM (Random Access Memory) 12, and a hardware interface (HW-IF) 14. The CPU 10 is connected to the ROM 11, the RAM 12, and the HW-IF 14 via a bus 19 for inputting/outputting a signal.

The ROM 11 stores a program for driving the CPU 10. The RAM 12 functions as a working memory for the CPU 10. The HW-IF 14 processes communication between the CPU 10, and the transmission units 2a, 2b and the reception units 3a, 3b. The HW-IF 14 is configured of a circuit such as FPGA (Field Programmable Gate Array) and ASIC (Application Specified Integrated Circuit).

When reading the program from the ROM 11, the CPU 10 constitute functions including an alarm collection section 100, an alarm transfer section 101, and a path switching section 102. The alarm collection section 100 collects various alarms from the transmission units 2a, 2b and the reception units 3a, 3b. The alarms include alarms outputted from the wavelength converters 24a, 24c, 34a, 34c and the optical amplifiers 23a to 23c, 25a, 25c, 33a to 33c, 35a, 35c as well as alarms transferred from the other control unit 1a, 1b by means of monitoring signal light. The alarm collection section 100 outputs the alarm to the alarm transfer section 101.

In the case where the alarm is not a transferred alarm, the alarm transfer section 101 transfers the alarm to the other control unit 1a, 1b by means of monitoring signal light. For example, the alarm transfer section 101 notifies information on the alarm to the optical amplifiers 23a to 23c, 25a, 25c, thereby inserting the alarm into the monitoring signal light. The alarm transfer section 101 notifies completion of alarm transfer processing to the path switching section 102. Also, in the case where the alarm is transferred, the alarm transfer section 101 notifies completion of the alarm transfer processing to the path switching section 102.

The path switching section 102 controls the optical switches 22a to 22c, 32a to 32c according to the notification, thereby switching the path for each of the wavelength multiplexed optical signals Sa to Sc.

Figure 8:
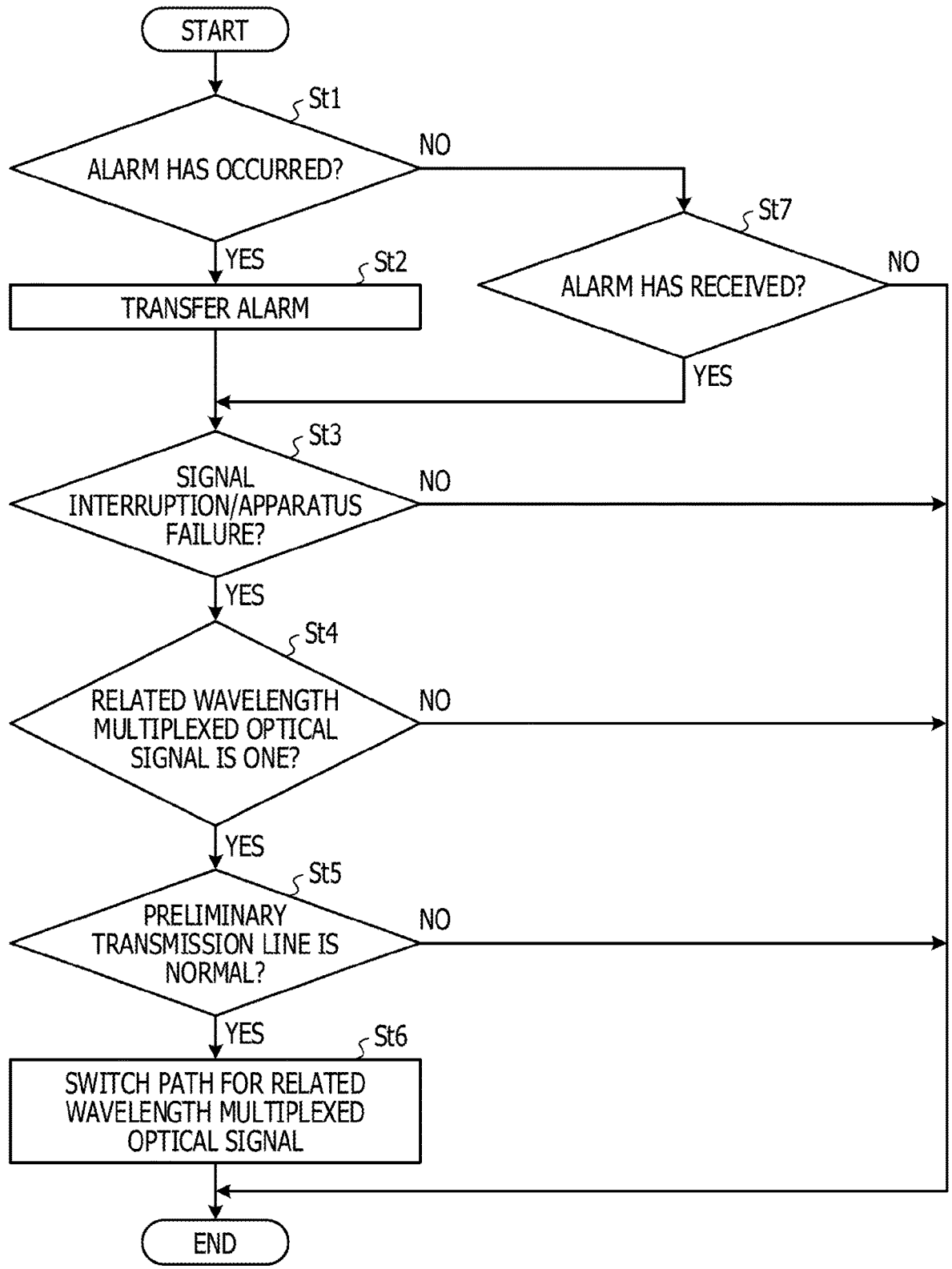
FIG. 8 is a flow chart illustrating an example of path switching processing of the control unit.

FIG. 8 is a flow chart illustrating an example of path switching processing of the control units 1a, 1b. The alarm collection section 100 determines whether or not an alarm has occurred in the wavelength converters 24a, 24c, 34a, 34c, and the optical amplifiers 23a to 23c, 25a, 25c, 33a to 33c, 35a, 35c (Step SU).

If the alarm has occurred (Yes in Step St1), the alarm transfer section 101 transfers the alarm to the other control unit 1a, 1b by means of monitoring signal light (Step St2). If no alarm has occurred (No in Step St1), the alarm collection section 100 determines whether or not the alarm transferred from the other control units 1a, 1b has been received (Step St7). If the alarm has not been received (No in Step St7), processing is terminated, and if the alarm has been received (Yes in Step St7), following processing in Step St3 is performed.

Next, the path switching section 102 determines whether or not the alarm indicates signal interruption or apparatus failure (Step St3). If the alarm does not indicate signal interruption or apparatus failure (No in Step St3), processing is finished.

If the alarm indicates signal interruption or apparatus failure (Yes in Step St3), the path switching section 102 determines whether or not only one of the wavelength multiplexed optical signals Sa to Sc corresponds to signal interruption or apparatus failure (Step St4). If two or more of wavelength multiplexed optical signals Sa to Sc correspond to signal interruption or apparatus failure (No in Step St4), the path switching section 102 may not transmit a plurality of wavelength multiplexed optical signals Sa to Sc to the preliminary transmission line 91 and thus, finishes processing.

If only one of the wavelength multiplexed optical signals Sa to Sc corresponds to signal interruption or apparatus failure (Yes in Step St4), the path switching section 102 determines whether or not the preliminary transmission line 91 is normal (Step St5). For example, the path switching section 102 may collect the alarm from the optical amplifiers 25d, 35d connected to the preliminary transmission line 91, to determine the state of the preliminary transmission line 91. The path switching section 102 determines that the preliminary transmission line 91 is abnormal if the optical amplifiers 25d, 35d have issued the alarm, and determines that the preliminary transmission line 91 is normal if neither the optical amplifier 25d or 35d has not issued the alarm.

If the preliminary transmission line 91 is abnormal (No in Step St5), the path switching section 102 may not transmit the wavelength multiplexed optical signals Sa to Sc to the preliminary transmission line 91 and thus, finishes processing. If the preliminary transmission line 91 is normal (Yes in Step St5), the path switching section 102 switches the path for the wavelength multiplexed optical signals Sa to Sc corresponding to signal interruption or apparatus failure from the active transmission line 90 to the preliminary transmission line 91 (Step St6). In this manner, the path switching processing is performed.

As described above, if signal interruption or apparatus failure has occurred in one of the wavelength multiplexed optical signals Sa to Sc, the control unit 1a in the transmission apparatus 8a on the transmission side controls each of optical switches 22a to 22c such that the one of the wavelength multiplexed optical signals Sa to Sc is outputted to the preliminary transmission line 91, and the other wavelength multiplexed optical signals Sa to Sc are outputted to the active transmission line 90. In this case, the control unit 1b in the transmission apparatus 8a on the reception side controls each of the optical switches 32a to 32c such that the one of the wavelength multiplexed optical signals Sa to Sc having signal interruption or apparatus failure is inputted from the preliminary transmission line 91 to the demultiplexers 31a to 31c, and the other wavelength multiplexed optical signals Sa to Sc are inputted from the wavelength conversion section 34 to the respective demultiplexers 31a to 31c. The control unit 1a is an example of a first control section, and the control unit 1b is an example of a second control section.

Therefore, the transmission system in this embodiment may automatically switch the path for each of the wavelength multiplexed optical signals Sa to Sc according to the occurrence of the signal interruption or the apparatus failure.

In the transmission system in this embodiment, even if a fault has occurred in the active transmission line 90, only one of the wavelength multiplexed optical signals Sa to Sc may be outputted to the preliminary transmission line 91. However, as in following embodiments, an optical switch for diverting the multiplexed light Smux of the wavelength multiplexed optical signals Sa to Sc to the preliminary transmission line 91 may be provided.

Second Embodiment

Figure 9:
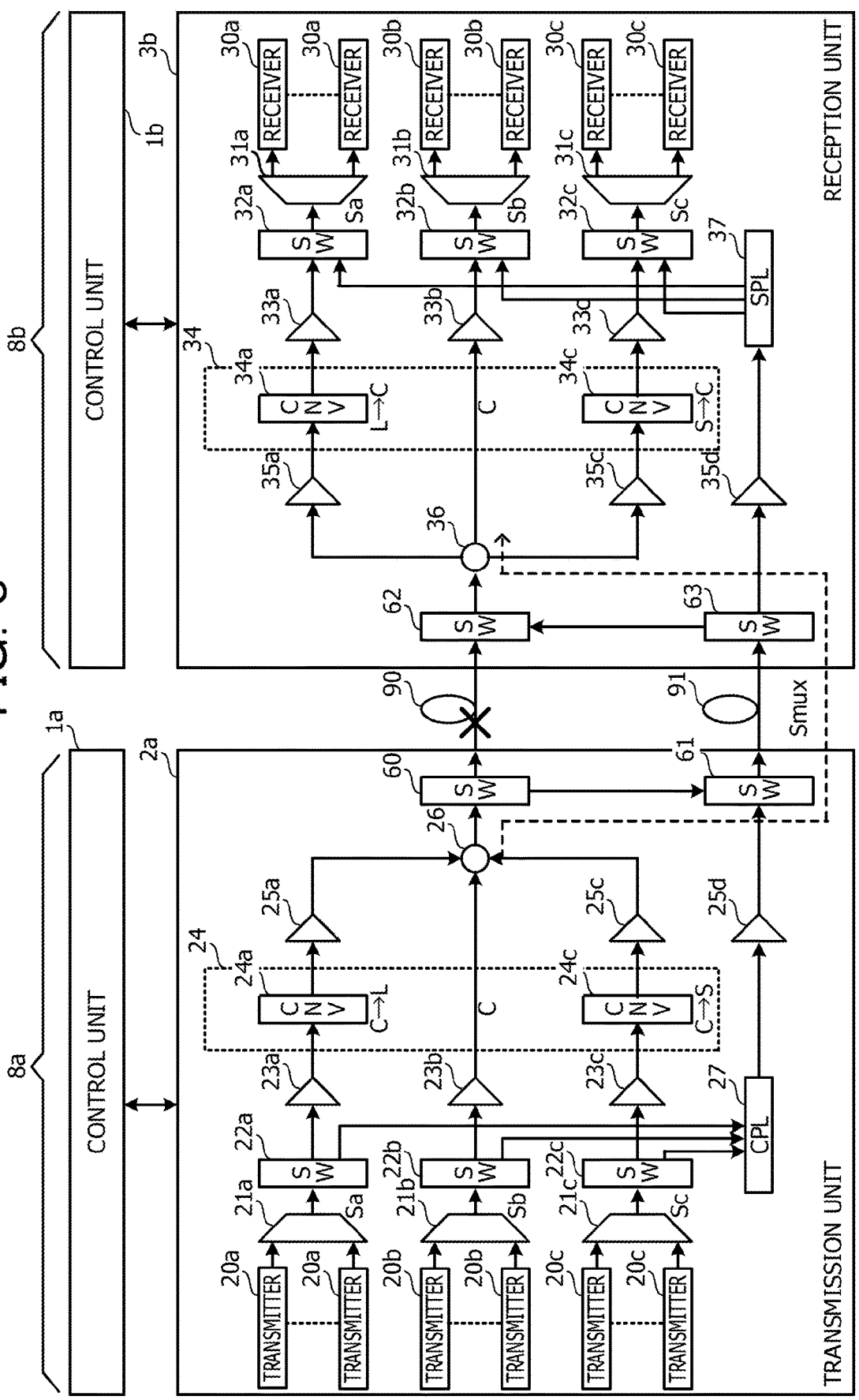
FIG. 9 is a configuration view illustrating a transmission system in Second embodiment.

FIG. 9 is a configuration view illustrating a transmission system in Second embodiment. The same elements in FIG. 9 as those in FIG. 5 are given the same reference numerals, and description thereof is omitted.

As compared with the configuration illustrated in FIG. 5, in the transmission unit 2a, an optical switch 60 is added between the multiplexer 26 and the active transmission line 90, and an optical switch 61 is added between the optical amplifier 25d and the preliminary transmission line 91. In the reception unit 3b, an optical switch 62 is added between the active transmission line 90 and the demultiplexer 36, and an optical switch 63 is added between the preliminary transmission line 91 and the optical amplifier 35d.

The optical switches 60, 61 are an example of a third selection section, and select the destination of the multiplexed light Smux from the active transmission line 90 and the preliminary transmission line 91. The optical switches 62, 63 are an example of a fourth selection section, and selects the source of the multiplexed light Smux from the active transmission line 90 and the preliminary transmission line 91.

More specifically, the optical switch 60 outputs the multiplexed light Smux from the multiplexer 26 to the active transmission line 90 when the active transmission line 90 is selected as the destination of the multiplexed light Smux, and outputs the multiplexed light Smux to the optical switch 61 when the preliminary transmission line 91 is selected as the destination of the multiplexed light Smux. The optical switch 61 outputs the wavelength multiplexed optical signals Sa to Sc from the optical amplifier 25d to the preliminary transmission line 91 when the active transmission line 90 is selected as the destination of the multiplexed light Smux, and outputs the multiplexed light Smux from the optical switch 60 to the preliminary transmission line 91 when the preliminary transmission line 91 is selected as the destination of the multiplexed light Smux.

The optical switch 63 outputs the multiplexed light Smux inputted from the preliminary transmission line 91 to the optical switch 62 when the active transmission line 90 is selected as the source of the multiplexed light Smux, and outputs the wavelength multiplexed optical signals Sa to Sc inputted from the preliminary transmission line 91 to the optical amplifier 35d when the preliminary transmission line 91 is selected as the source of the multiplexed light Smux. The optical switch 62 outputs the multiplexed light Smux inputted from the active transmission line 90 to the demultiplexer 36 when the active transmission line 90 is selected as the source of the multiplexed light Smux, and outputs the multiplexed light Smux inputted to the optical switch 63 to the demultiplexer 36 when the preliminary transmission line 91 is selected as the source of the multiplexed light Smux.

For this reason, when the optical switches 60, 61 select the preliminary transmission line 91 as the destination of the multiplexed light Smux, and the optical switch 62, 63 select the preliminary transmission line 91 as the source of the multiplexed light Smux, as represented by dotted lines, the multiplexed light Smux is inputted from the transmission unit 2a to the reception unit 3a through the preliminary transmission line 91. For this reason, even if a fault occurs in the active transmission line 90 (see a sign X), transmission of each of the wavelength multiplexed optical signals Sa to Sc from the transmission unit 2a to the reception unit 3a may be continued.

The optical switches 60, 61 are controlled by the control unit 1a, and the optical switches 62, 63 are controlled by the control unit 1b. The control units 1a, 1b transmit/receive monitoring signal light, thereby sharing an alarm of the active transmission line 90, and controls the optical switches 60 to 63 so as to select the preliminary transmission line 91 according to the alarm.

Figure 10:
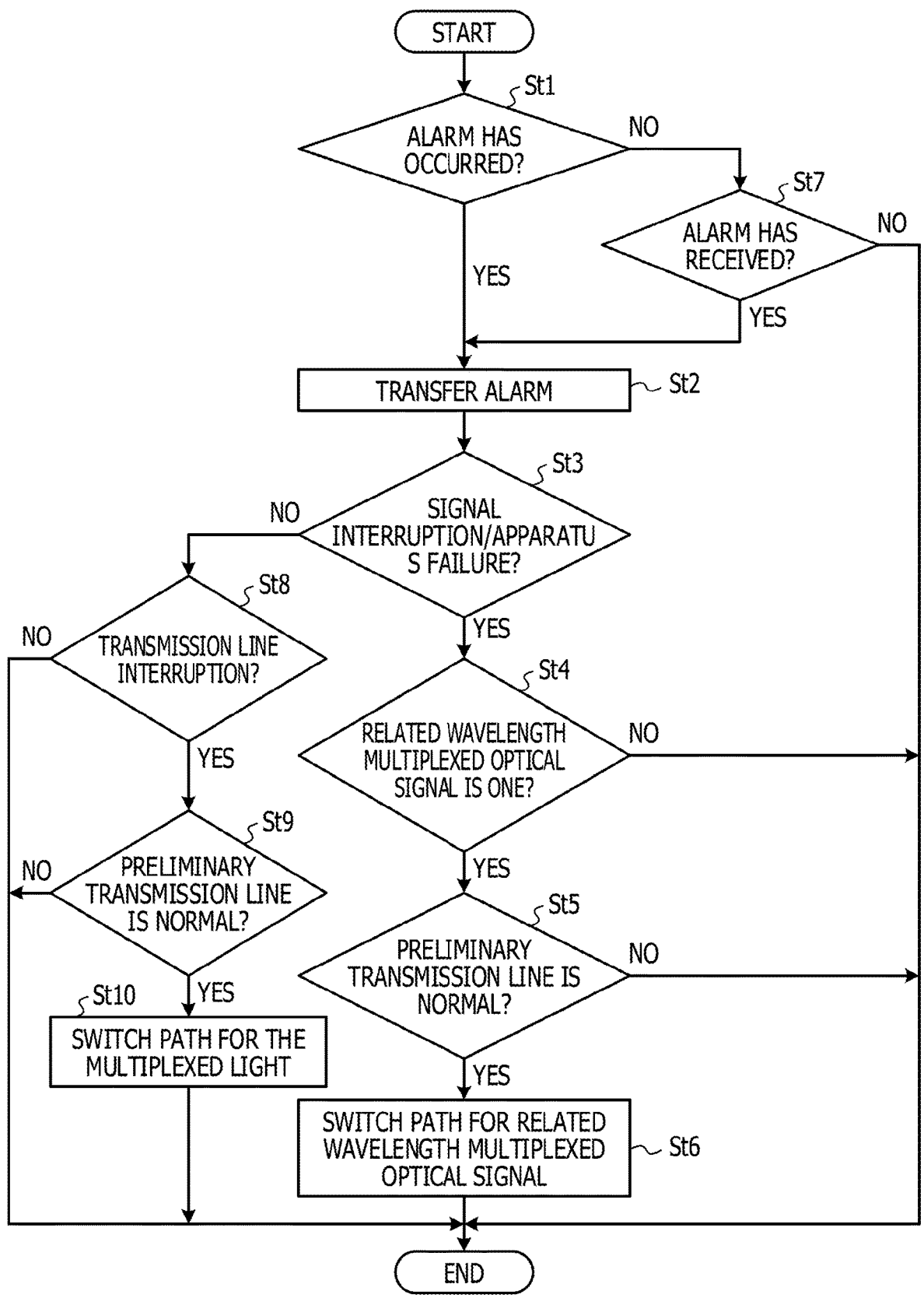
FIG. 10 is a flow chart illustrating another example of the path switching processing of the control unit.

FIG. 10 is a flow chart illustrating another example of path switching processing of the control units 1a, 1b. The same elements in FIG. 10 as those in FIG. 8 are given the same reference numerals, and description thereof is omitted.

If the alarm does not indicate signal interruption or apparatus failure (No in Step St3), the path switching section 102 determines whether or not interruption of the active transmission line 90 (hereinafter described as "transmission line interruption") has occurred (Step St8). For example, the path switching section 102 determines that transmission line interruption has occurred if an alarm indicating interruption of input light has been issued in the optical amplifiers 33a to 33c in the reception unit 3a, and determines that transmission line interruption has not occurred if the alarm has not been issued.

If transmission line interruption has not occurred (No in Step St8), the path switching section 102 finishes processing. If transmission line interruption has occurred (Yes in Step St8), the path switching section 102 determines whether or not the preliminary transmission line 91 is normal (Step St9). How to determine the state of the preliminary transmission line 91 is the same as Step St5.

If the preliminary transmission line 91 is abnormal (No in Step St9), the path switching section 102 finishes processing. If the preliminary transmission line 91 is normal (Yes in Step St9), the path switching section 102 controls the optical switch 60 to 63 to switch the path for the multiplexed light Smux from the active transmission line 90 to the preliminary transmission line 91 (Step SUM. In this manner, the path switching processing is performed.

Third Embodiment

Figure 11:
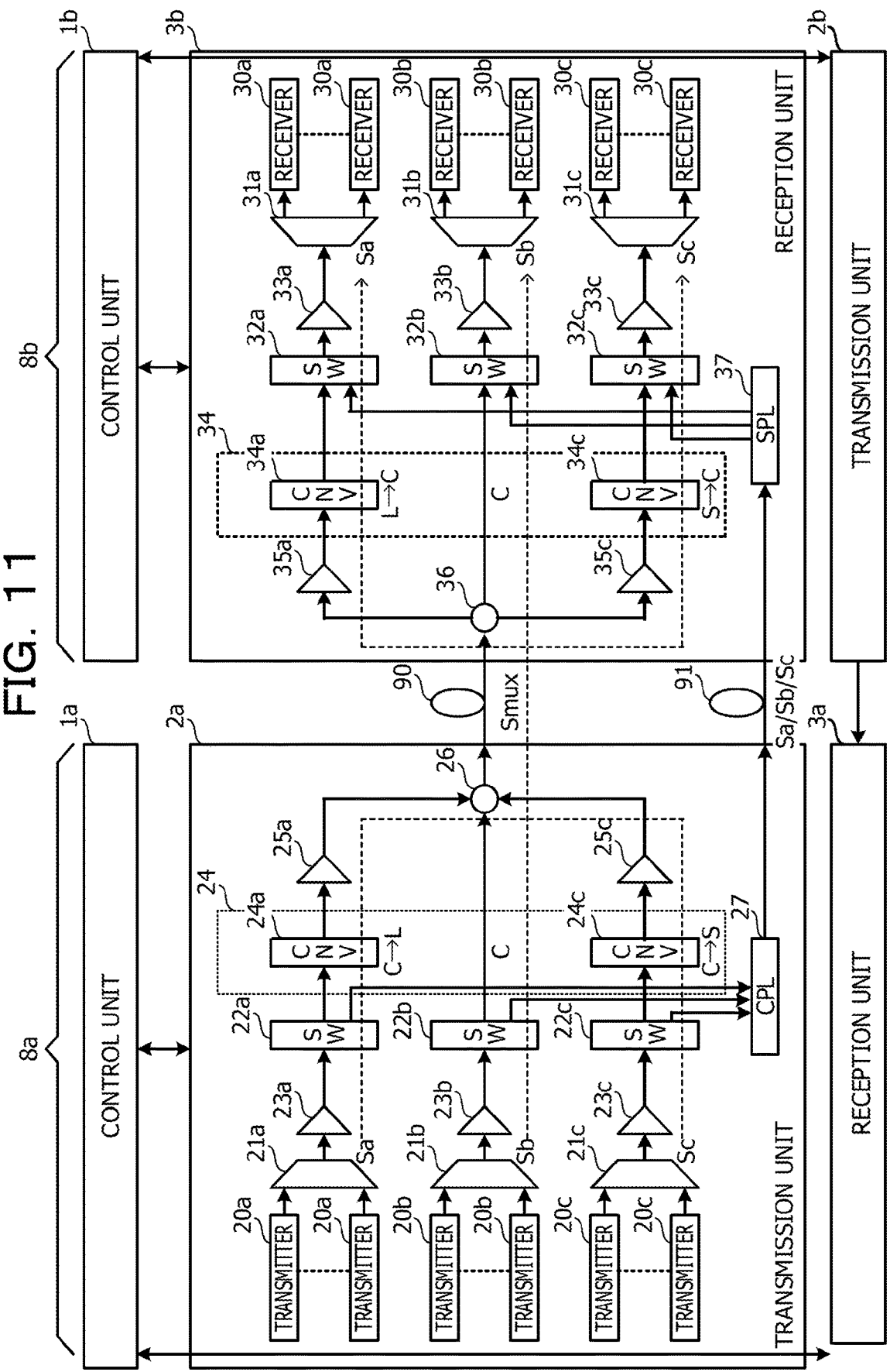
FIG. 11 is a configuration view illustrating a transmission system in Third embodiment.

FIG. 11 is a configuration view illustrating a transmission system in Third embodiment. The same elements in FIG. 11 as those in FIG. 5 are given the same reference numerals, and description thereof is omitted.

In the transmission system in this embodiment, the optical switches 22a to 22c are connected between the optical amplifiers 23a to 23c and the wavelength conversion section 24, and the optical switches 32a to 32c are connected between the optical amplifiers 33a to 33c and the wavelength conversion section 34.

For this reason, only the amplified wavelength multiplexed optical signals Sa to Sc are inputted to the optical coupler 27. Therefore, as compared with the transmission system in First embodiment, the transmission system in this embodiment is not provided with the optical amplifiers 25d, 35d, achieving downsizing.

Fourth Embodiment

Figure 12:
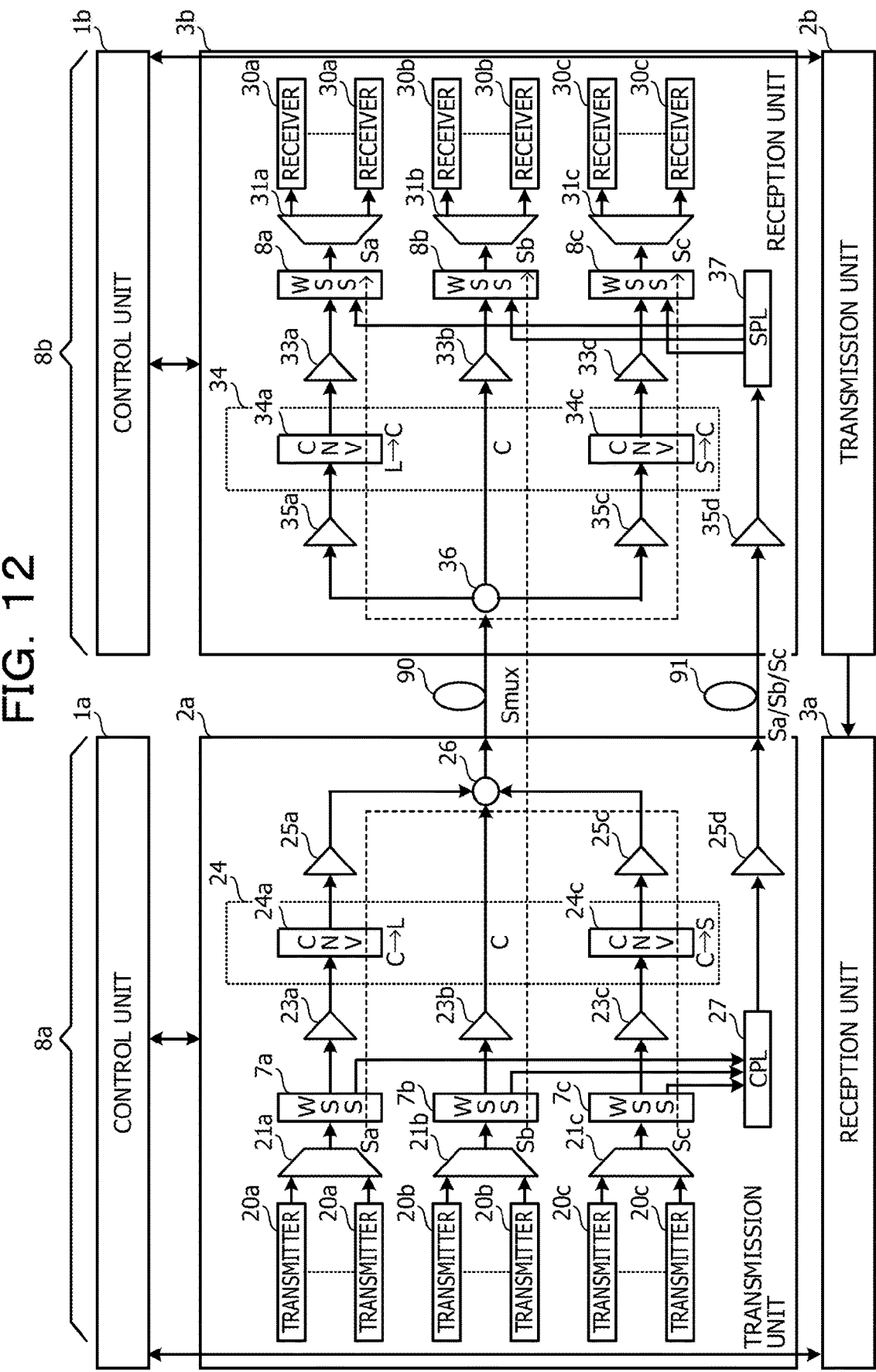
FIG. 12 is a configuration view illustrating a transmission system in Fourth embodiment.

FIG. 12 is a configuration view illustrating a transmission system in Fourth embodiment. The same elements in FIG. 12 as those in FIG. 5 are given the same reference numerals, and description thereof is omitted.

The transmission system in this embodiment is provided with wavelength selection switches 7a to 7c in place of the optical switches 22a to 22c in First embodiment, and wavelength selection switches 8a to 8c in place of the optical switches 32a to 32c in First embodiment. The wavelength selection switches 7a to 7c are an example of first selection sections, and the wavelength selection switches 8a to 8c are an example of second selection sections.

The wavelength selection switches 7a to 7c are controlled by the control unit 1a. When detecting a fault about the wavelength multiplexed optical signals Sa to Sc, the control unit 1a controls each of the wavelength selection switches 7a to 7c such that only the wavelength multiplexed optical signal having the fault among the wavelength multiplexed optical signals Sa to Sc is outputted to the preliminary transmission line 91.

For example, when detecting a fault about the wavelength multiplexed optical signal Sc, the control unit 1a switches the destination of the wavelength multiplexed optical signal Sc from the wavelength selection switch 7c to the preliminary transmission line 91, and keeps the destination of the wavelength multiplexed optical signals Sa, Sb from the other wavelength selection switches 7a, 7b to be the active transmission line 90. Thereby, the wavelength selection switch 7c outputs the wavelength multiplexed optical signal Sc to the optical coupler 27, and the other wavelength selection switches 7a, 7b outputs the wavelength multiplexed optical signals Sa, Sb to the optical amplifiers 23a, 23b.

The wavelength selection switches 8a to 8c are controlled by the control unit 1b. When detecting a fault about any of the wavelength multiplexed optical signals Sa to Sc, the control unit 1b controls each of the wavelength selection switches 8a to 8c such that only the wavelength multiplexed optical signal having the fault among the wavelength multiplexed optical signals Sa to Sc to the respective demultiplexers 31a to 31c through the preliminary transmission line 91.

For example, when detecting a fault about the wavelength multiplexed optical signal Sc, the control unit 1b switches the source of the wavelength selection switch 8c to the preliminary transmission line 91, and keeps the source of the other wavelength selection switches 8a, 8b to be the active transmission line 90. Thereby, the wavelength multiplexed optical signal Sc is inputted to the demultiplexer 31c through the preliminary transmission line 91, and the wavelength multiplexed optical signals Sa, Sb are inputted to the other demultiplexers 31a, 31b through the active transmission line 90, that is, the wavelength conversion section 34.

For this reason, like the transmission system in First embodiment, the transmission system in this embodiment may switch the transmission line for the wavelength multiplexed optical signals Sa to Sc.

Fifth Embodiment

The transmission unit 2a is provided with the three optical switches 22a to 22c, or 32a to 32c in First to Third embodiments. However, three multiplexers 21a to 21c may be provided in place of the three optical switches. In this case, as described below, the number of optical switches in the transmission unit 2a may be one.

Figure 13:
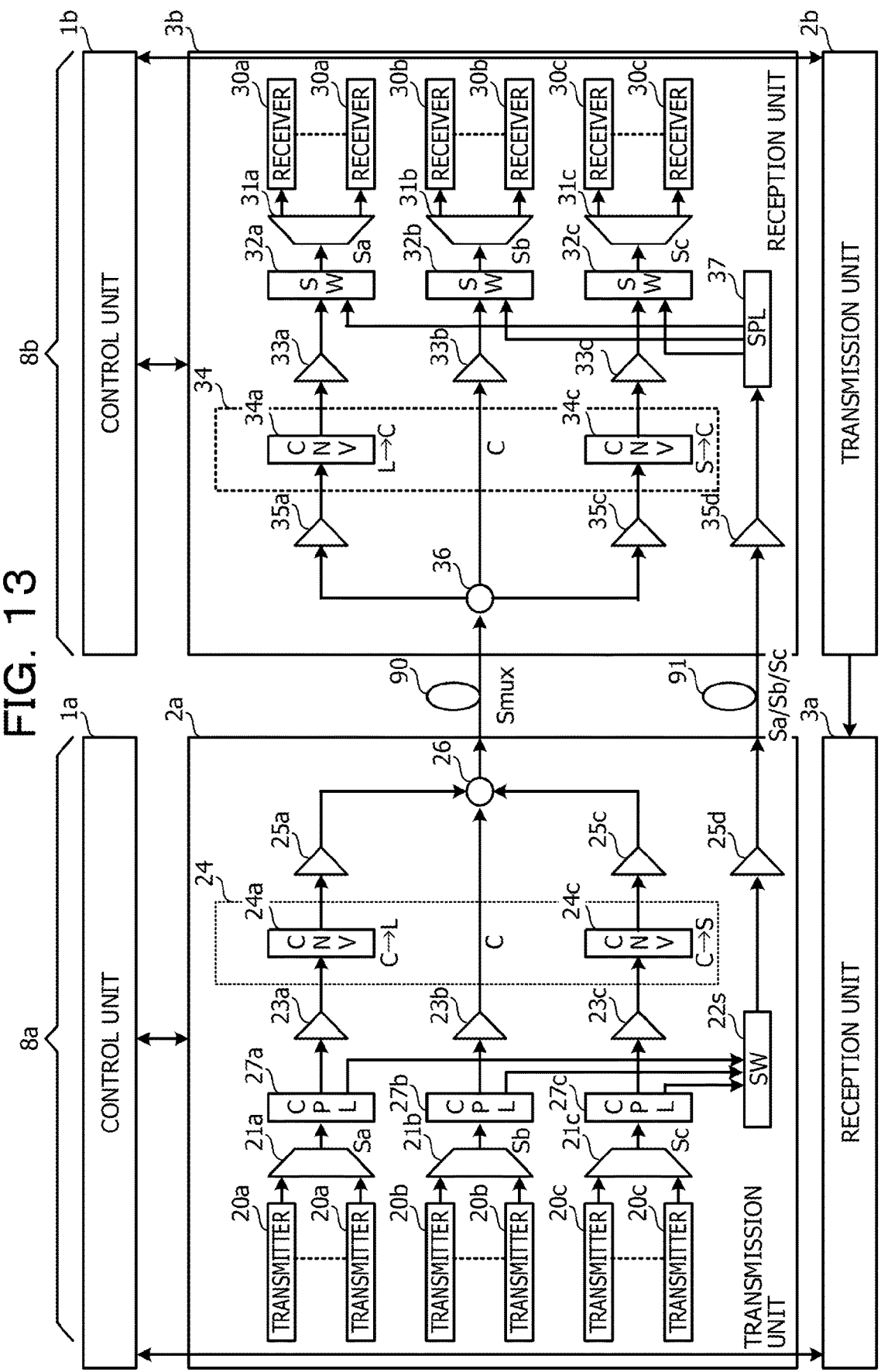
FIG. 13 is a configuration view illustrating a transmission system in Fifth embodiment.

FIG. 13 is a configuration view illustrating a transmission system in Fifth embodiment. The same elements in FIG. 13 as those in FIG. 5 are given the same reference numerals, and description thereof is omitted. The transmission method in the other embodiments is performed by below-mentioned processing of the transmission system.

As compared with the configuration illustrated in FIG. 5, in the transmission unit 2a, optical couplers 27a to 27c are provided between the multiplexers 21a to 21c and the optical amplifiers 23a to 23c, and an optical switch 22s is provided between the optical couplers 27a to 27c and the optical amplifier 25d.

The optical couplers 27a to 27c are an example of a plurality of split sections, and split each of the wavelength multiplexed optical signals Sa to Sc in the C band into two. Ones of split wavelength multiplexed optical signals Sa to Sc are inputted to the optical switch 22s.

The optical switch 22s is an example of a signal output section, and selects one of the wavelength multiplexed optical signals Sa to Sc from ones of split wavelength multiplexed optical signals Sa to Sc, to output the selected wavelength multiplexed optical signal to the preliminary transmission line 91. The optical switch 22s is controlled by the control unit 1a. The control unit 1a controls the optical switch 22s such that only the wavelength multiplexed optical signals Sa to Sc having signal interruption or apparatus failure is outputted to the preliminary transmission line 91.

The wavelength conversion section 24 converts the wavelength band of the others of split wavelength multiplexed optical signals Sa to Sc into different wavelength bands. The multiplexer 26 multiplexes the wavelength multiplexed optical signals Sa to Sc, the wavelength band of which is converted, thereby generating multiplexed light Smux, and outputs the multiplexed light Smux to the active transmission line 90. For this reason, even if signal interruption or apparatus failure occurs, all of the wavelength multiplexed optical signals Sa to Sc are multiplexed to multiplexed light Smux, and the multiplexed light Smux is inputted to the active transmission line 90.

In the reception unit 3b, the demultiplexer 36 demultiplexes the multiplexed light Smux inputted through the active transmission line 90 into the wavelength multiplexed optical signals Sa to Sc, and the wavelength conversion section 34 converts the wavelength band of the wavelength multiplexed optical signals Sa to Sc demultiplexed from the multiplexed light Smux into the C band.

The optical switches 32a to 32c are an example of a plurality of source selection sections, and select the source of the wavelength multiplexed optical signals Sa to Sc to the demultiplexers 31a to 31c from the wavelength conversion section 34 and the preliminary transmission line 91. For this reason, even if the wavelength multiplexed optical signals Sa to Sc having signal interruption or apparatus failure are inputted from the wavelength conversion section 34, the optical switches 32a to 32c corresponding to the wavelength multiplexed optical signals Sa to Sc do not output the signals to the demultiplexers 31a to 31c, but output the wavelength multiplexed optical signals Sa to Sc inputted from the preliminary transmission line 91 to the demultiplexers 31a to 31c.

For this reason, like the transmission systems in the other embodiments, the transmission system in this embodiment may transmit only the wavelength multiplexed optical signals Sa to Sc having signal interruption or apparatus failure to the preliminary transmission line 91. As compared with the transmission system in First embodiment, in the transmission unit 2a in this embodiment, the number of the optical couplers 27a to 27c increases to three, but the number of optical switches 22s decreases to one, enabling downsizing of redundant configuration. The configuration including the optical switch 22s and the optical couplers 27a to 27c may be provided in the transmission unit 2a illustrated in FIG. 9.

The above-described embodiments are preferred embodiments of the present disclosure. However, the present disclosure is not limited to these embodiments, and may be variously modified within the subject matter of the present disclosure.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical transmission system, comprising:
a transmission apparatus; and
a reception apparatus, the transmission apparatus and the reception apparatus being interconnected via a first transmission line and a second transmission line, wherein
the transmission apparatus includes:
a first transmitter configured to output a first optical signal having a wavelength belonging to a first wavelength band;
a first switch configured to output the first optical signal being outputted from the first transmitter toward the first transmission line or the second transmission line;
a first wavelength converter configured to convert the first optical signal being outputted from the first switch toward the first transmission line into a second optical signal having a wavelength belonging to a second wavelength band other than the first wavelength band;
a second transmitter configured to output a third optical signal having a wavelength belonging to the first wavelength band;
a first multiplexer configured to multiplex the second optical signal and the third optical signal and output the multiplexed optical signal to the first transmission line; and
a second multiplexer configured to wavelength-multiplex optical signals including the first optical signal outputted from a plurality of first transmitters, and output a multiplexed optical signal to the first switch, and
the reception apparatus includes:
a demultiplexer configured to demultiplex the multiplexed optical signal inputted from the first transmission line into the third optical signal and the second optical signal;
a first receiver configured to receive the third optical signal from the demultiplexer;
a second wavelength converter configured to convert the second optical signal into the first optical signal; and
a second receiver configured to receive the first optical signal that being converted from the second optical signal or the first optical signal received through the second transmission line.

2. An optical transmission apparatus comprising:
a first transmitter configured to output a first optical signal having a wavelength belonging to a first wavelength band;
a switch configured to output the first optical signal being outputted from the first transmitter toward a first transmission line or a second transmission line;
a wavelength converter configured to convert the first optical signal being outputted from the switch toward the first transmission line into a second optical signal having a wavelength belonging to a second wavelength band other than the first wavelength band;
a second transmitter configured to output a third optical signal having a wavelength belonging to the first wavelength band;
a first multiplexer configured to multiplex the second optical signal and the third optical signal, and output a multiplexed optical signal to the first transmission line; and
a second multiplexer configured to wavelength-multiplex optical signals including the first optical signal outputted from a plurality of first transmitters, and output a multiplexed optical signal to the switch.

3. The optical transmission apparatus according to claim 2, further comprising:
a second multiplexer configured to wavelength-multiplex optical signals including the first optical signal outputted from a plurality of first transmitters via a plurality of switches, and output a multiplexed optical signal to the wavelength converter.

4. The optical transmission apparatus according to claim 2, wherein
the switch outputs the first optical signal toward the second transmission line when the first optical signal having a wavelength with a fault.

5. An optical transmission method comprising:
- outputting a first optical signal having a wavelength belonging to a first wavelength band;
- wavelength-multiplexing optical signals including the first optical signal outputted from a plurality of first transmitters, and outputting the multiplexed optical signal;
- outputting, by a switch, the first optical signal included in the multiplexed optical signal toward a first transmission line or a second transmission line;
- converting the first optical signal being outputted toward the first transmission line into a second optical signal having a wavelength in a second wavelength band other than the first wavelength band;
- outputting a third optical signal having a wavelength belonging to the first wavelength band; and
- multiplexing the second optical signal and the third optical signal, and outputting the multiplexed optical signal to the first transmission line.

6. The optical transmission method according to claim 5, further comprising:
- wavelength-multiplexing the first optical signals outputted toward the first transmission line among a plurality of first optical signals having different wavelengths; and
- wavelength-converting a plurality of wavelength-multiplexed first optical signals.

7. The optical transmission method according to claim 5, further comprising:
- wavelength-multiplexing a plurality of first optical signals having different wavelengths, the first optical signals being outputted from a plurality of first transmitters,
- outputting the plurality of wavelength-multiplexed first optical signal toward the first transmission line or the second transmission line.

8. The optical transmission method according to claim 5, wherein
- outputting the first optical signal toward the second transmission line when the first optical signal having a wavelength with a fault.

* * * * *